US012144446B1

(12) United States Patent
Kretsinger

(10) Patent No.: US 12,144,446 B1
(45) Date of Patent: Nov. 19, 2024

(54) COMBINATION MARKETING BEVERAGE CONTAINER AND GAME CARRIER

(71) Applicant: Michael J. Kretsinger, Arrington, TN (US)

(72) Inventor: Michael J. Kretsinger, Arrington, TN (US)

( * ) Notice: Subject to any disclaimer, the term of this patent is extended or adjusted under 35 U.S.C. 154(b) by 160 days.

(21) Appl. No.: 17/976,103

(22) Filed: Oct. 28, 2022

(51) Int. Cl.

| | |
|---|---|
| ***G09F 11/00*** | (2006.01) |
| ***A47G 23/02*** | (2006.01) |
| ***B65D 25/20*** | (2006.01) |
| ***B65D 81/38*** | (2006.01) |
| *G09F 3/00* | (2006.01) |
| *G09F 3/02* | (2006.01) |
| *G09F 11/21* | (2006.01) |
| *G09F 23/00* | (2006.01) |

(52) U.S. Cl.
CPC ..... *A47G 23/0266* (2013.01); *B65D 81/3865* (2013.01); *G09F 2003/0273* (2013.01); *G09F 3/0289* (2013.01); *G09F 11/21* (2013.01); *G09F 23/00* (2013.01)

(58) Field of Classification Search
CPC ............ A47G 23/0266; A47G 19/2227; A47G 19/025; A63F 3/0023; A63F 2003/00258; B43K 29/12; B43K 29/00; B65D 23/08; B65D 81/3865; B65D 5/4229; B65D 25/205; B65D 51/245; B65D 85/672; B65D 2203/00; G09F 3/0289; G09F 3/20; G09F 3/00; G09F 11/08; G09F 11/21; G09F 23/00; G09F 2003/0272; G09F 2003/0273; G09F 3/02; G09F 11/30; B42D 15/00; Y10S 242/905
USPC ........ 40/514, 310, 311; 156/577; 206/459.5, 206/534, 225, 579, 232, 459.1; 215/230; 220/737; 242/379, 385; 273/285, 286
See application file for complete search history.

(56) References Cited

U.S. PATENT DOCUMENTS

| | | | | | |
|---|---|---|---|---|---|
| 724,760 | A * | 4/1903 | Henry | A63F 3/0023 | 273/286 |
| 948,506 | A * | 2/1910 | Gilbert | G09F 11/29 | D11/135 |
| 991,608 | A * | 5/1911 | Day | A45B 3/00 | 40/317 |
| 1,759,596 | A * | 5/1930 | Steudte | B43K 29/12 | 34/89.1 |
| 2,029,236 | A * | 1/1936 | Klophaus | B43K 29/0875 | 40/335 |
| 2,111,362 | A * | 3/1938 | Fisher | B43K 29/0875 | 242/380 |
| 2,500,824 | A * | 3/1950 | Horvath | A63F 3/00895 | 273/286 |
| 3,471,957 | A * | 10/1969 | Blanche | G06G 1/001 | 40/306 |
| 3,711,976 | A * | 1/1973 | Allen | A47G 1/14 | 40/514 |
| 3,963,358 | A | 6/1976 | Houser | | |
| 4,463,664 | A | 8/1984 | Peace | | |
| 4,745,776 | A | 5/1988 | Clark | | |
| 4,789,073 | A | 12/1988 | Fine | | |

(Continued)

*Primary Examiner* — Gideon R Weinerth
(74) *Attorney, Agent, or Firm* — Dietz Law Office LLC

(57) ABSTRACT

A beverage container suitable for containing a beverage or beverage vessel, wherein the beverage container includes at least two separate displays, one of which is extendable and retractable. The container may further include a stowage compartment for stowing travel games or other objects.

20 Claims, 30 Drawing Sheets

(56) References Cited

U.S. PATENT DOCUMENTS

| | | | | |
|---|---|---|---|---|
| 4,963,048 | A | 10/1990 | Thomas et al. | |
| 5,090,213 | A | 2/1992 | Glassman | |
| 5,271,244 | A | 12/1993 | Staggs | |
| 5,359,797 | A * | 11/1994 | Williamson | G09F 11/29 40/904 |
| 5,762,234 | A | 6/1998 | Kiel et al. | |
| D401,967 | S | 12/1998 | Tum | |
| 5,909,821 | A | 6/1999 | Guridi | |
| 6,039,207 | A | 3/2000 | Ademek | |
| 6,206,223 | B1 | 3/2001 | Wicker | |
| 6,247,864 | B1 | 6/2001 | Walsh | |
| 6,263,940 | B1 | 7/2001 | Menayan | |
| 6,301,812 | B1 * | 10/2001 | Klunk | G09F 11/21 283/117 |
| 6,354,754 | B1 | 3/2002 | Pan | |
| 6,367,652 | B1 | 4/2002 | Toida et al. | |
| 6,425,494 | B1 | 7/2002 | Woods, II | |
| 6,620,281 | B1 | 9/2003 | Sommers | |
| 6,905,275 | B1 * | 6/2005 | Del Valle | B43K 23/128 401/52 |
| 7,228,987 | B2 | 6/2007 | Jones | |
| D572,316 | S * | 7/2008 | Billen | D21/483 |
| 7,888,898 | B2 | 2/2011 | Wilkerson | |
| 8,016,506 | B2 | 9/2011 | Adamberry | |
| 8,104,202 | B2 * | 1/2012 | Alipour | G09F 3/0289 40/310 |
| 8,235,424 | B2 * | 8/2012 | Garcia | A63C 11/228 280/819 |
| 8,356,434 | B2 | 1/2013 | Allpour | |
| D742,179 | S | 11/2015 | Scheidler | |
| 9,227,458 | B2 | 1/2016 | Kelly | |
| 9,245,430 | B1 | 1/2016 | Berg | |
| 9,420,908 | B1 | 8/2016 | White | |
| 10,611,551 | B2 | 4/2020 | Luchak | |
| 10,625,904 | B2 | 4/2020 | Serras et al. | |
| 10,898,018 | B2 | 1/2021 | Parinella | |
| 10,918,570 | B1 * | 2/2021 | Hincher, Sr. | A61J 1/00 |
| 11,089,892 | B2 | 4/2021 | Manochio | |
| D947,613 | S | 4/2022 | Wahl | |
| 11,304,550 | B1 | 4/2022 | Cosgorea et al. | |
| D939,889 | S | 6/2022 | Ni | |
| 11,738,901 | B1 * | 8/2023 | Pishahang | B65C 9/08 156/391 |
| 2003/0056410 | A1 | 3/2003 | Witkowski | |
| 2004/0040968 | A1 | 3/2004 | Visser | |
| 2004/0045856 | A1 * | 3/2004 | Rhoades | B65D 25/205 206/459.5 |
| 2005/0205588 | A1 | 9/2005 | Pitts | |
| 2006/0222442 | A1 | 10/2006 | Lin | |
| 2007/0031619 | A1 * | 2/2007 | Mirabell | G09F 3/10 428/34.1 |
| 2007/0235929 | A1 * | 10/2007 | Nip | A63F 3/0023 273/285 |
| 2008/0121545 | A1 * | 5/2008 | Jones | B65D 25/205 206/459.5 |
| 2008/0197097 | A1 | 8/2008 | Montgomery | |
| 2009/0139126 | A1 | 6/2009 | Alipour | |
| 2010/0038279 | A1 * | 2/2010 | Estep | G09F 23/00 283/67 |
| 2010/0130339 | A1 | 5/2010 | Junkins | |
| 2010/0139135 | A1 | 6/2010 | Taylor et al. | |
| 2010/0162601 | A1 * | 7/2010 | Kim | G09F 11/30 40/514 |
| 2011/0174658 | A1 | 6/2011 | Otsubo | |
| 2011/0307421 | A1 | 12/2011 | Molz | |
| 2012/0006712 | A1 * | 1/2012 | Kaplan | B65D 51/002 220/592.2 |
| 2012/0012647 | A1 | 1/2012 | Almbekov | |
| 2012/0023795 | A1 | 2/2012 | Qian | |
| 2012/0168400 | A1 | 7/2012 | Wang | |
| 2012/0193366 | A1 | 8/2012 | Miller | |
| 2013/0006188 | A1 * | 1/2013 | Pommereau | G09F 3/0295 604/189 |
| 2013/0020223 | A1 | 1/2013 | White | |
| 2013/0320027 | A1 | 12/2013 | Casillas | |
| 2016/0310833 | A1 * | 10/2016 | Vu | A63F 3/00895 |
| 2021/0139226 | A1 | 5/2021 | Monaghan | |
| 2022/0133068 | A1 | 5/2022 | Sherburne | |
| 2022/0135315 | A1 | 5/2022 | Hu | |
| 2022/0154993 | A1 | 5/2022 | Padgett | |
| 2023/0282137 | A1 * | 9/2023 | Raistrick | G09F 3/02883 40/310 |

* cited by examiner

COMBINATION MARKETING BEVERAGE CONTAINER AND GAME CARRIER

CROSS-REFERENCE TO RELATED APPLICATIONS

Not Applicable

FEDERAL SPONSORSHIP

Not Applicable

JOINT RESEARCH AGREEMENT

Not Applicable

TECHNICAL FIELD

This invention pertains generally to marketing beverage vessels or containers. More particularly, the invention pertains to a combination marketing beverage container that also includes a marketing display pull-out and a stowage compartment. Without limitation intended, the pull-out display may be used to communicate information, advertisement, marketing, or instructions for playing games included in the stowage compartment.

BACKGROUND

Over the years, re-usable drink containers have been utilized as a promotional or marketing tool as well as a useful product. By way of example, coffee mugs, drinking glasses, and beverage koozies have had pictures, logos, slogans, advertisements, or other indica imprinted, etched, embossed or otherwise applied to the outside sidewall of the vessel to convey the indicia to observers. Further, companies have used drink containers as a promotional tool for its employees or prospective customers. Although effective to communicate certain indicia, the size of the beverage container has limited the amount and type of information that may be included on the outside of the container. The present invention expands the possibilities for advertising, marketing, and otherwise conveying indicia to others with the utilization of a drink container.

SUMMARY

Embodiments according to aspects of the invention are incorporated into a beverage container. The beverage container of the present invention may include advertising or other indicia that is conveyed to an observer from a visible exterior of the container, while also including a pull-out member that is suitable for conveying additional indicia to an observer when the pull-out member is extended. The pull-out member is extendable but may also retract into a hidden retracted or stowed position. A switch and sound chip may also be hidden within the container, wherein the switch activates the sound chip when the pull-out member is pulled out of the retracted position. Without limitation intended, the beverage container may be in the form of a beverage coozie or a drinking vessel. The beverage container of the present invention includes an outer shell, inner shell, extendable and retractable pull-out member and a cover or lid to retain the pull-out member between the inner and outer shell.

The outer shell has an open top and an at least partially enclosed bottom. Similarly, the inner shell has an open top and an at least partially enclosed bottom. Both shells may include a partially enclosed bottom to allow air to escape when a beverage container, such as a can or bottle, is inserted into the inner shell. Alternatively, the inner shell bottom may be enclosed to contain a beverage therein, or the inner sidewall may be sized to provide a slight gap between the inner sidewall of the inner shell and the beverage container to allow air to escape between the two. The inner shell is sized to fit within the outer shell. In accordance with certain embodiments of the invention the inner shell may be manufactured from an insulative material to help keep the beverage container cool. The extendable and retractable pull-out member is positioned between the outer shell and inner shell. The outer shell includes a slot extending through a sidewall of the outer shell such that an insert of the pull-out member slides through the slot between an extended and retracted position. The cap is engaged to enjoin an open end of the outer shell and an open end of the inner shell, wherein the cap retains the pull-out between the inner shell and outer shell. The inner and outer shells may be fixed with respect to each other by known suitable mechanisms including, for example, a press fit, locking tabs, screws, or adhesive.

In certain embodiments the beverage container may further include a removable base or stowage container engaged to a portion of the bottom of the outer shell. The insert of the pull-out member may have one end fixed to a retention member such as an arm, cage or middle shell. When retracted the insert of the pull-out wraps between the inner and outer shell. When a middle shell or cage is utilized, the insert wraps around the cage or middle shell. Further, the pull-out member may include a coil mechanism to retract the insert and a lock button to engage the cage and retain the insert in an extended position. Also, the pull-out member may include a stop attached to a free end of the insert to restrict the pull-out member from completely retracting into the container, wherein the stop also provides a gripping surface for the user to grab or hold the pull-out member when extending from the container. The insert may include an advertising or marketing display and the outer shell may further include indicia displayed on an external side of the outer shell. In this manner the beverage container may be utilized to display, for example, a primary advertisement and secondary advertisement.

Without limitation intended the insert may be made of a known suitable flexible, durable material such as a thin polypropylene, waterproof paper, plastic sheet, or lenticular sheet. The pull-out member may further include an arm oriented between the inner and outer shell such that an end of the insert is attached to the arm, and wherein a base of arm is attached to a coil mechanism fixed to the lower ends of the inner and outer shells. In certain embodiments a plurality of arms is combined to form a cage. Also, the outer shell may be comprised of a separable bottom disc and an annular sidewall. The sidewall surface of the outer shell may be made from a translucent or transparent material or may be made from a lenticular sheet. Alternatively, the outer sidewall may be made from an opaque or colored material. Those skilled in the art will appreciate that when the outer shell is transparent the outer surface of the pull-out is visible to an observer.

In certain embodiments of the present invention the beverage container comprises an outer shell, an inner shell, an extendable and retractable pull-out member, a coil mechanism contained between the inner and outer shell, an arm fixed to the coil mechanism, a cap or annular ring surrounding the space between the open end of the inner and outer shells, and a removeable base. The inner and outer shells have an open top and an at least partially enclosed bottom. At least a portion of the inner shell is contained within an interior of the outer shell and an interior of the inner shell is suitable for containing a beverage vessel therein. The extendable and retractable pull-out member is positioned between the outer shell and inner shell. The outer shell includes a slot extending through a sidewall of the outer shell such that an insert of the pull-out member slides through the slot between an extended and retracted position. The coil mechanism facilitates movement of the pull-out member between a retracted and extended position. The arm is oriented between the inner and outer shells. An end of the insert is attached to the arm and a base of the arm is attached to the coil mechanism. When the insert is extended through the slot the coil mechanism winds and applies tension against the insert to draw the insert back into the container between the inner and outer shells. Also, the pull-out member may include a lock button that cooperates with the coil mechanism to engage the arm and retain the insert in an extended position when in a locked position. The cap further retains the pull-out between the inner shell and outer shell. The removable base is engaged to a portion of the at least partially enclosed bottom of the outer shell. The removable base may be used as a stowage compartment for game pieces or other desired objects.

In certain embodiments according to aspects of the invention the beverage container may further include a plurality of arms that are combined to form a cage. Further, in a retracted position the insert of the pull-out member may wrap around the plurality of arms. Also, the pull-out member may include a lock button that cooperates with the coil mechanism to engage the cage and retain the insert in an extended position when in a locked position. Additionally, the insert may include indicia displayed on at least one side of the insert and indicia may be further applied to an exterior of the outer shell. Alternatively, the outer shell may be transparent to allow a view to observe the indicia on the insert when the insert is in the retracted position. Without limitation intended the insert may be made of a suitable flexible material such as a thin plastic sheet or a lenticular sheet.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

Figure 1:
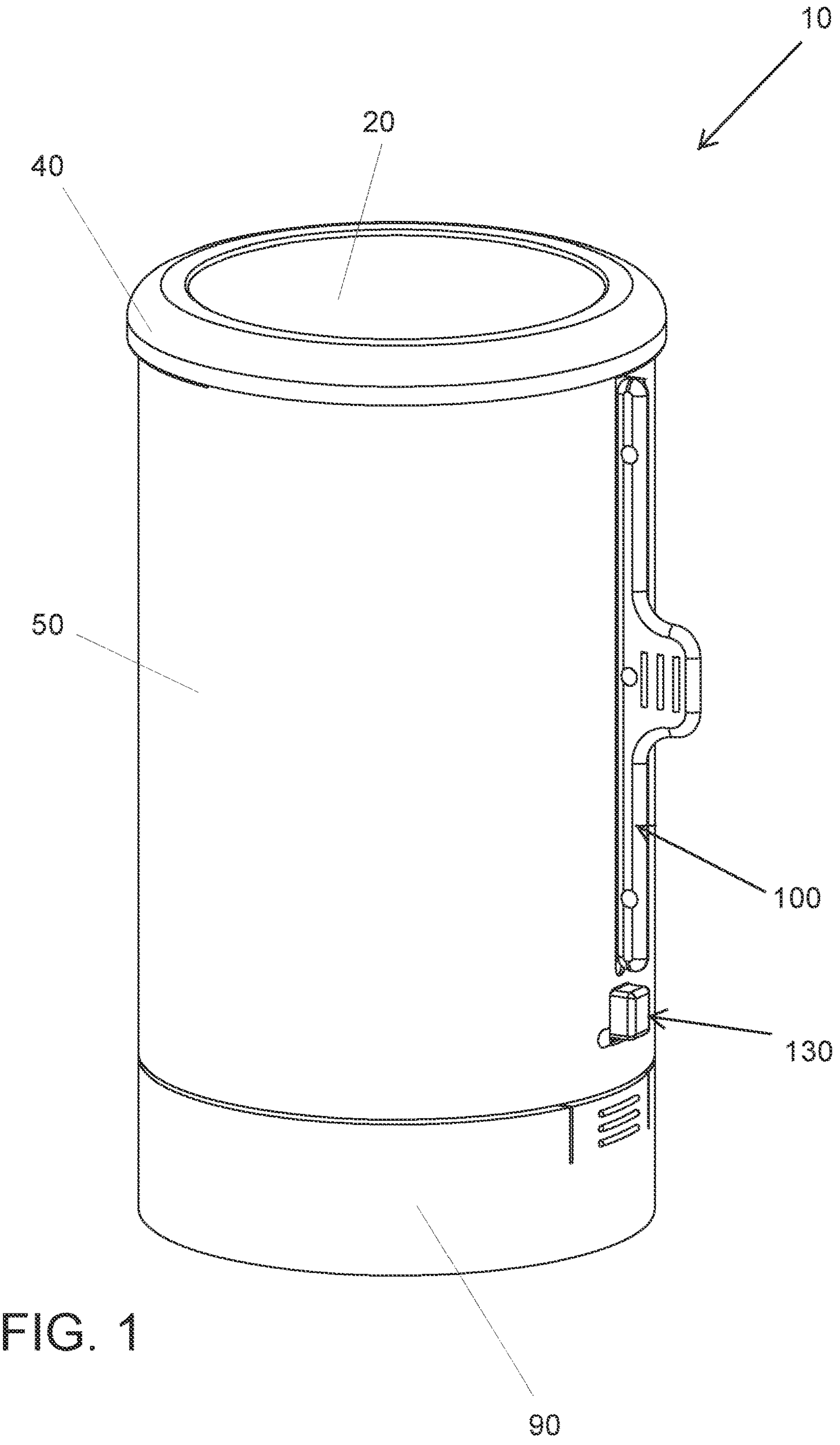
FIG. 1 is a top front perspective view of a marketing beverage container in accordance with aspects of the present invention.
Figure 2:
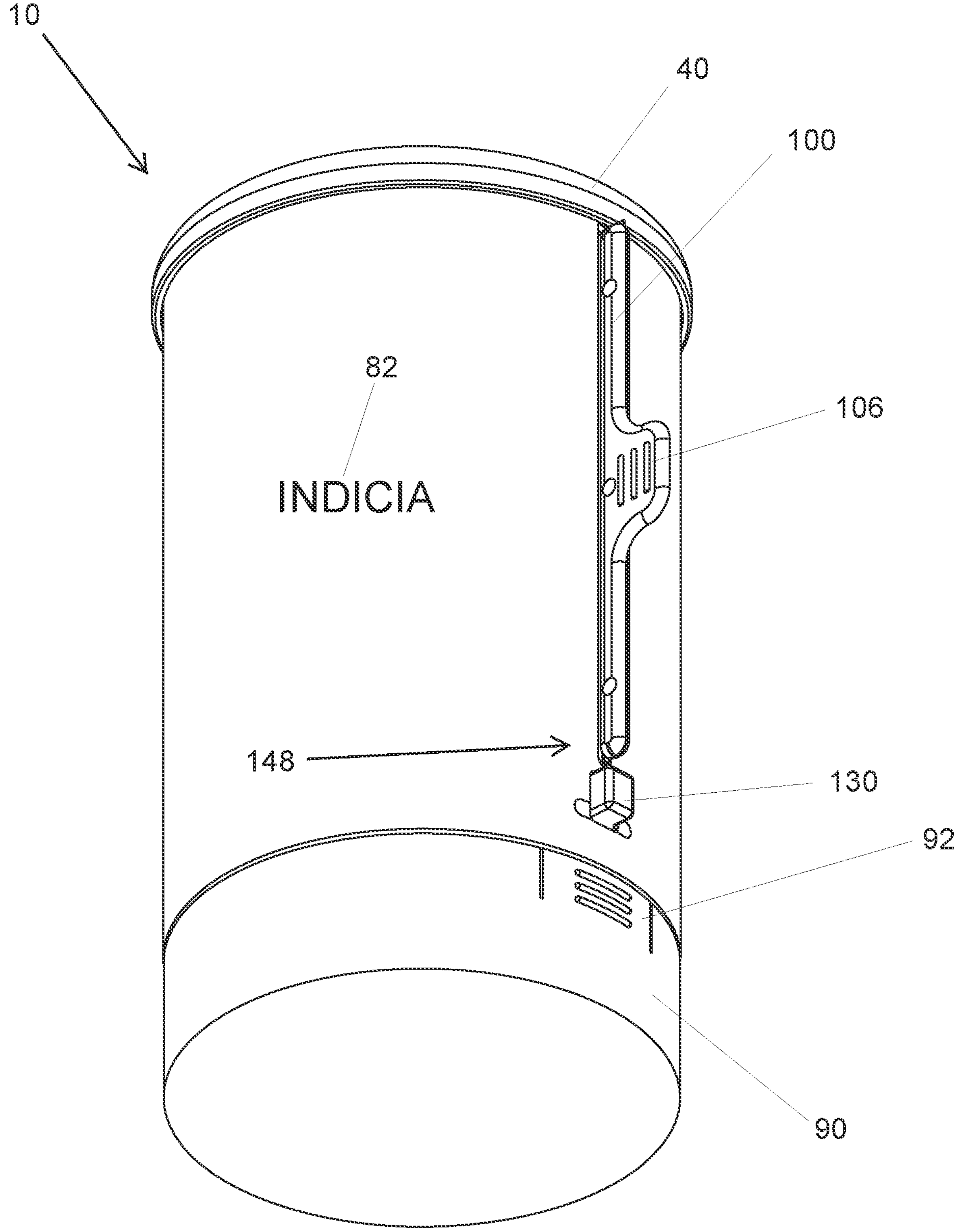
FIG. 2 is a bottom front perspective view of a marketing beverage container in accordance with aspects of the present invention.
Figure 3:
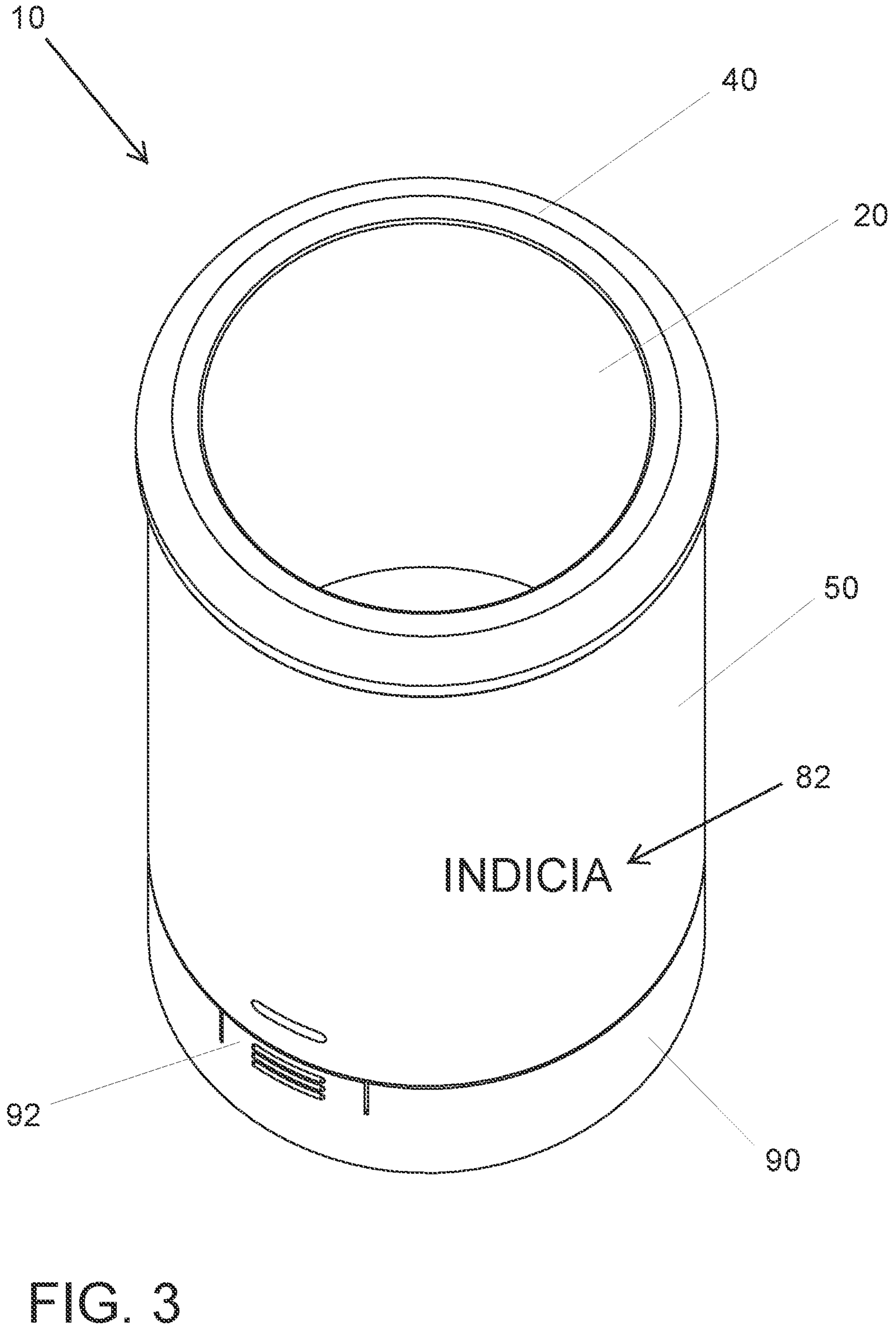
FIG. 3 is a top back perspective view of a marketing beverage container in accordance with aspects of the present invention.
Figure 4:
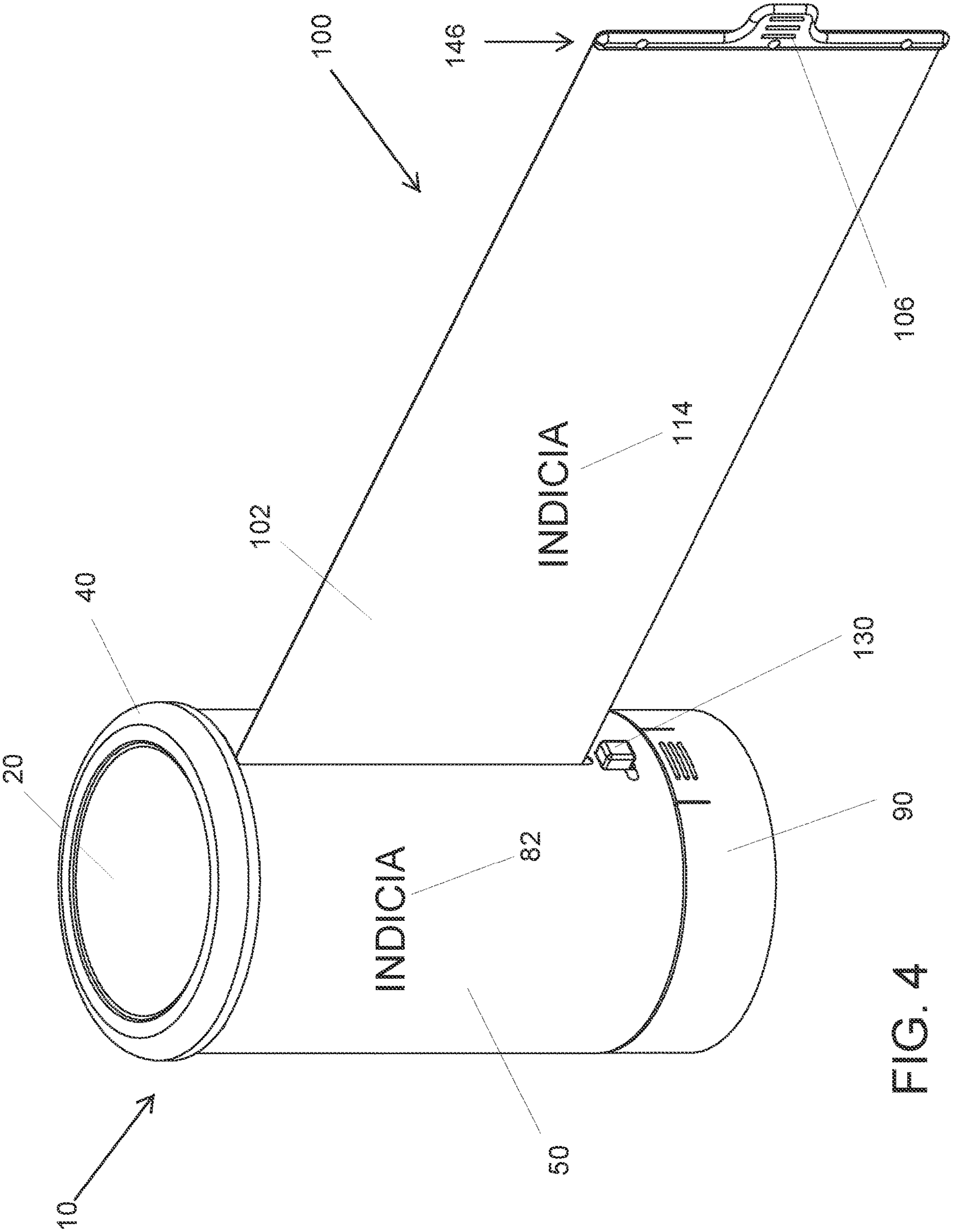
FIG. 4 is a front top perspective view of a marketing beverage container in accordance with aspects of the present invention illustrating the pull-out extended from the container.
Figure 5:
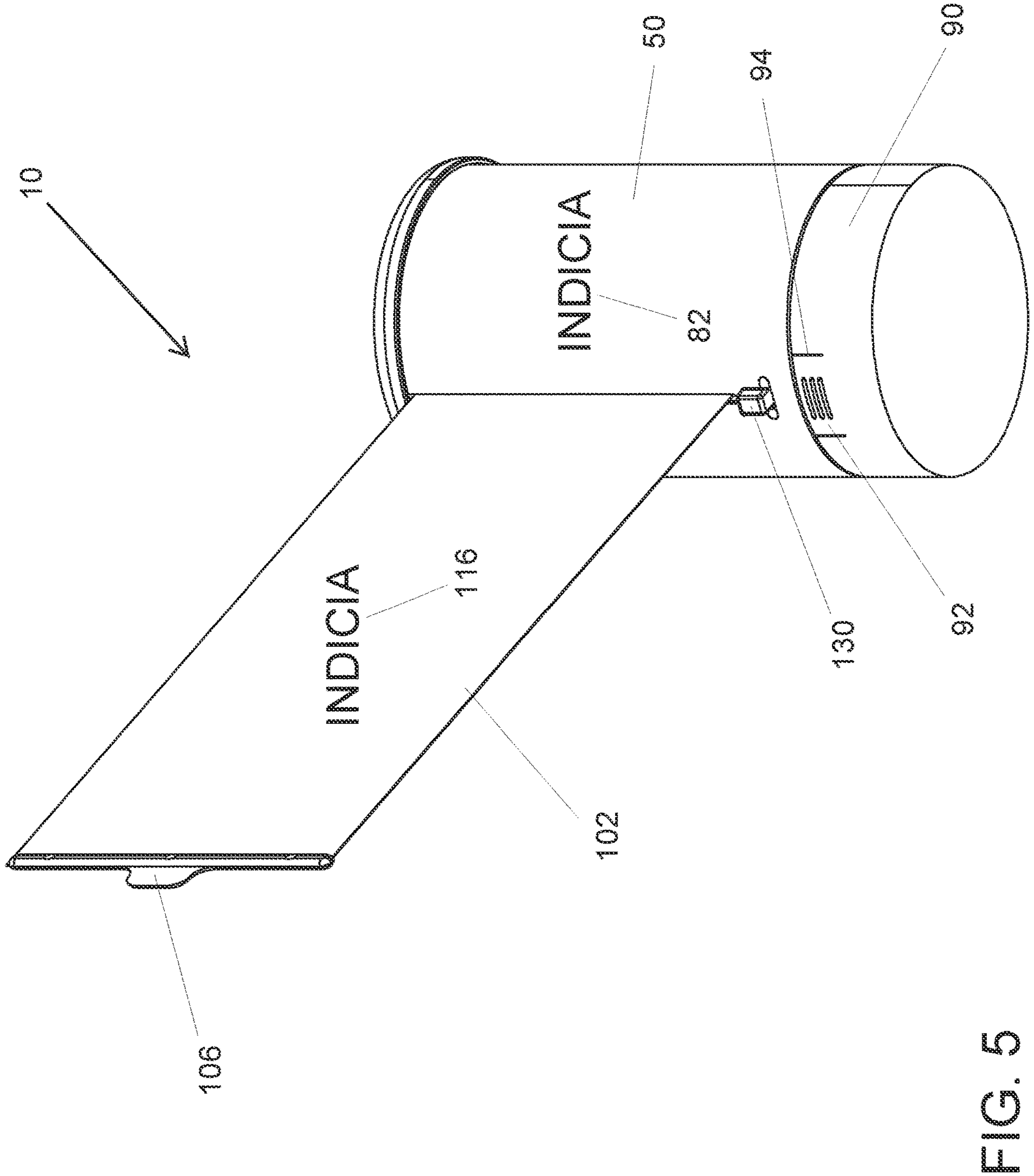
FIG. 5 is a front bottom perspective view of a marketing beverage container in accordance with aspects of the present invention illustrating the pull-out extended from the container.

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The apparatus 10 of the present invention is well suited to convey a primary and secondary set of information or indicia to an observer while providing a beverage holder for a user. The beverage holder apparatus 10 may additionally serve as a game or object carrier. A pull-out member 100 is contained between inner and outer walls 22 and 52 of the beverage container. The pull-out member 100 includes an insert 102 that extends through a slot 70 formed in the outer wall 52 of the beverage container 10. When desired, a coil mechanism 200 reels or winds the insert 102 between and inner and outer wall of the container. The insert 102 includes secondary information on either one or both of the front and back of the insert. The primary and secondary information or indicia is particularly well suited for dual advertising or marketing. A first advertisement is seen by an observer when viewing the exterior of the beverage apparatus 10 and the secondary information (on one or both sides of the insert) is seen when the insert is pulled out of the beverage container. When the outer shell sidewall is made from a translucent or transparent material the first advertisement is on the outer side of the insert and the secondary information is on the inside surface of the insert. As an alternative the insert may include informative information, such as rules of play for game pieces contained within a removeable base 90. Reference to the figures will provide an even more detailed description of various embodiments of the invention.

Figure 24:
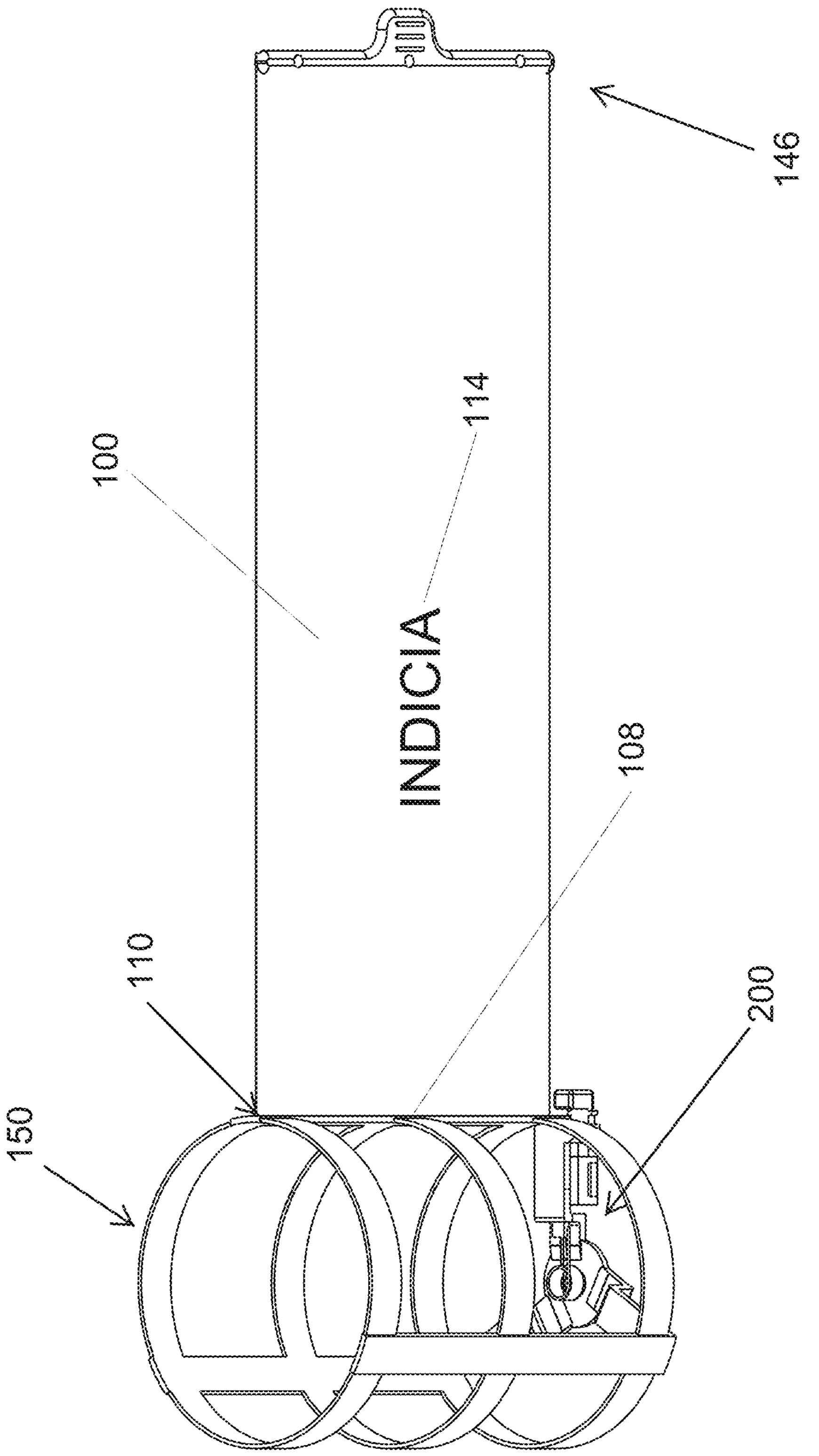
FIG. 24 is a front perspective view of a retention member having multiple arms of the beverage container in accordance with aspects of the invention and illustrating the lock button and coil spring engaged thereto and illustrating a pull-out member engaged to an arm and oriented in the extended position.
Figure 25:
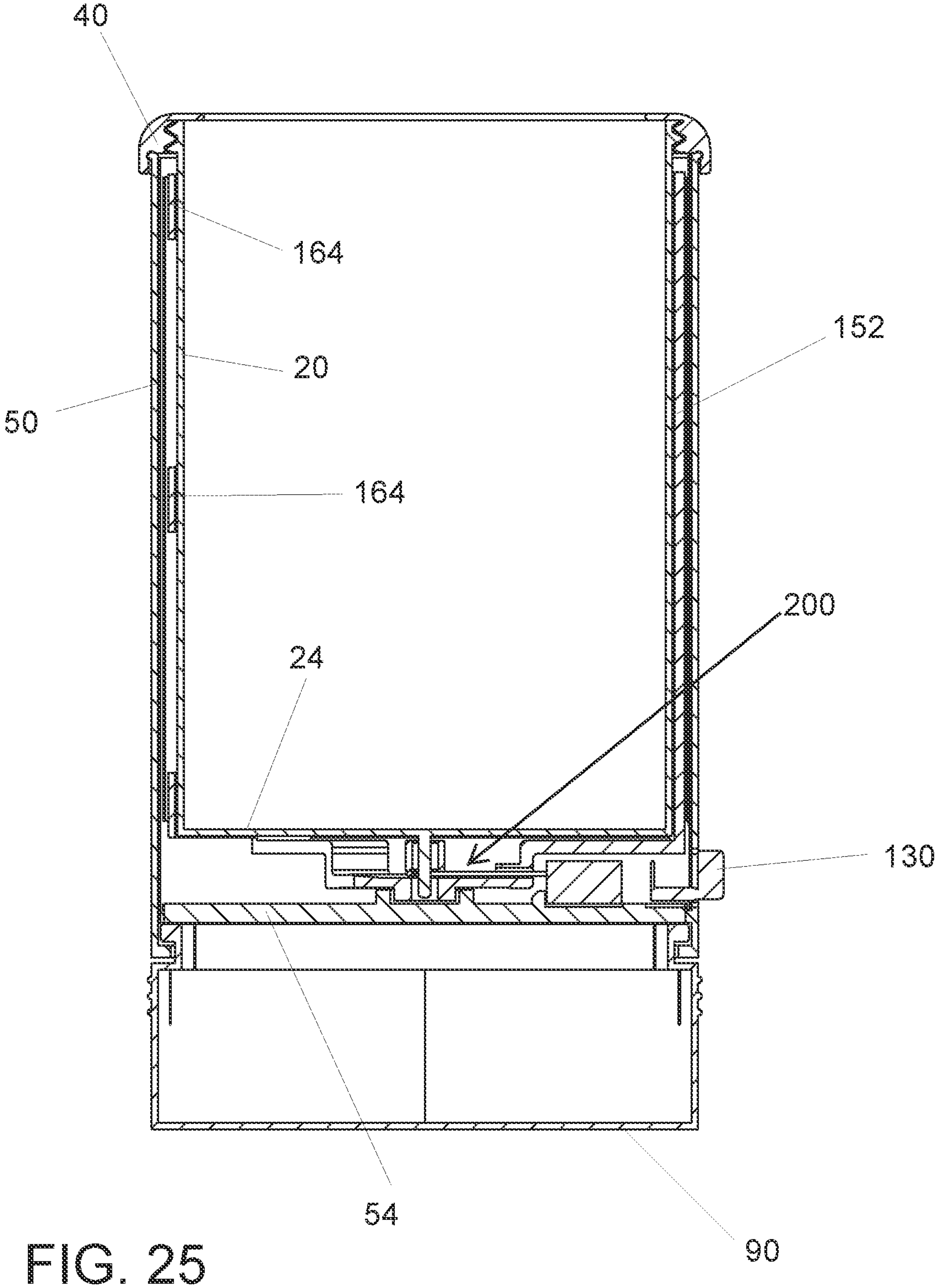
FIG. 25 is a partial sectional side elevational view of a beverage container in accordance with aspects of the invention.
Figure 26:
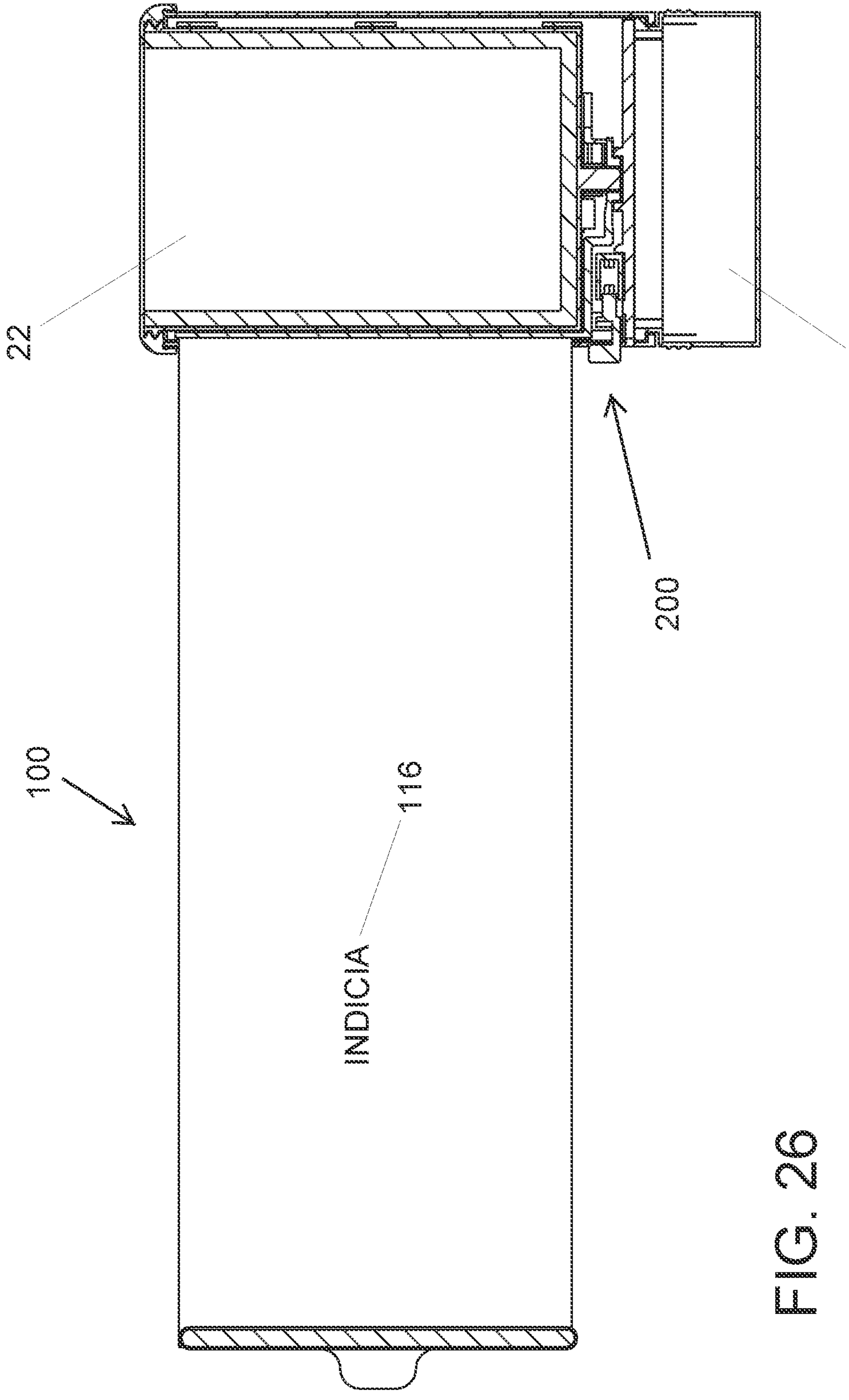
FIG. 26 is a partial sectional side elevational view of a beverage container in accordance with aspects of the invention and illustrating a pull-out member engaged to an arm and oriented in the extended position.

With reference to FIGS. 1-5 a beverage container holder apparatus 10 in accordance with the present invention is shown having an inner shell 20, outer shell 50, removeable cap and base 40 and 90 respectively, a pull-out member 100 and a lock mechanism or assembly 130. The pull-out member 100 includes an insert 102 having a free end and fixed end. The free end includes a stop 106 coupled to the free end. The stop provides a gripping surface for the user to grab or hold when pulling the insert 102 out of the container 10. The insert extends and retracts from the slot 70 between an extended position 146 and retracted position 148. Indicia 82 may be printed, embossed, etched, written or otherwise affixed to a surface of the outer sidewall 52 (see FIGS. 2 and 3). In certain embodiments the sidewall 52 is transparent and the indicia is fixed to an inner surface of the outer sidewall 52. Similarly, indicia 114 and 116 may be formed on the front and back surfaces of the insert 102 (see also, FIGS. 24 and 26). A lock mechanism or member 130 retains and releases the pull-out between the extended and retracted or stowed positions.

Figure 6:
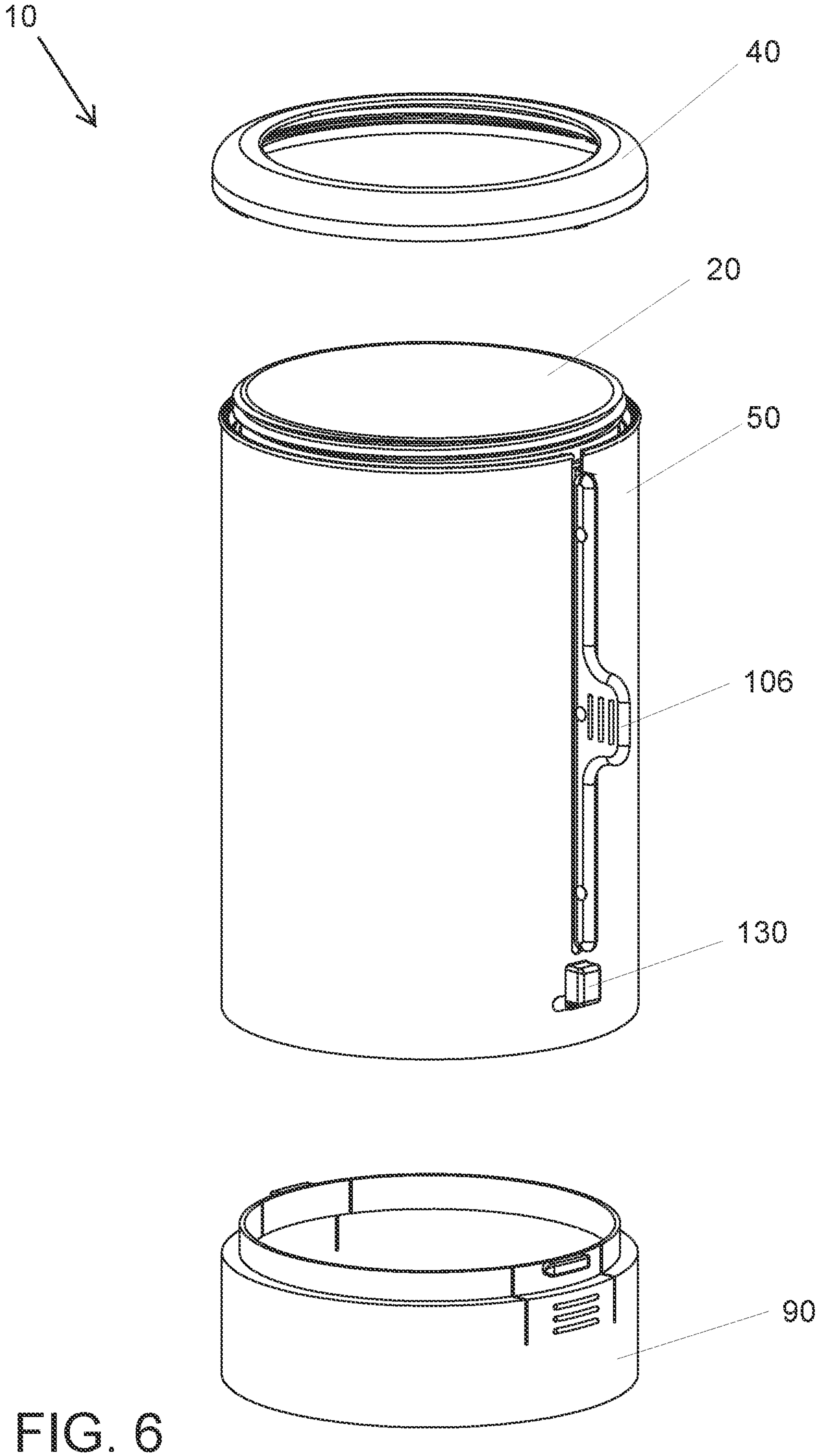
FIG. 6 is a front perspective view of a marketing beverage container in accordance with aspects of the present invention illustrating the lid and storage compartment removed from the container.
Figure 7:
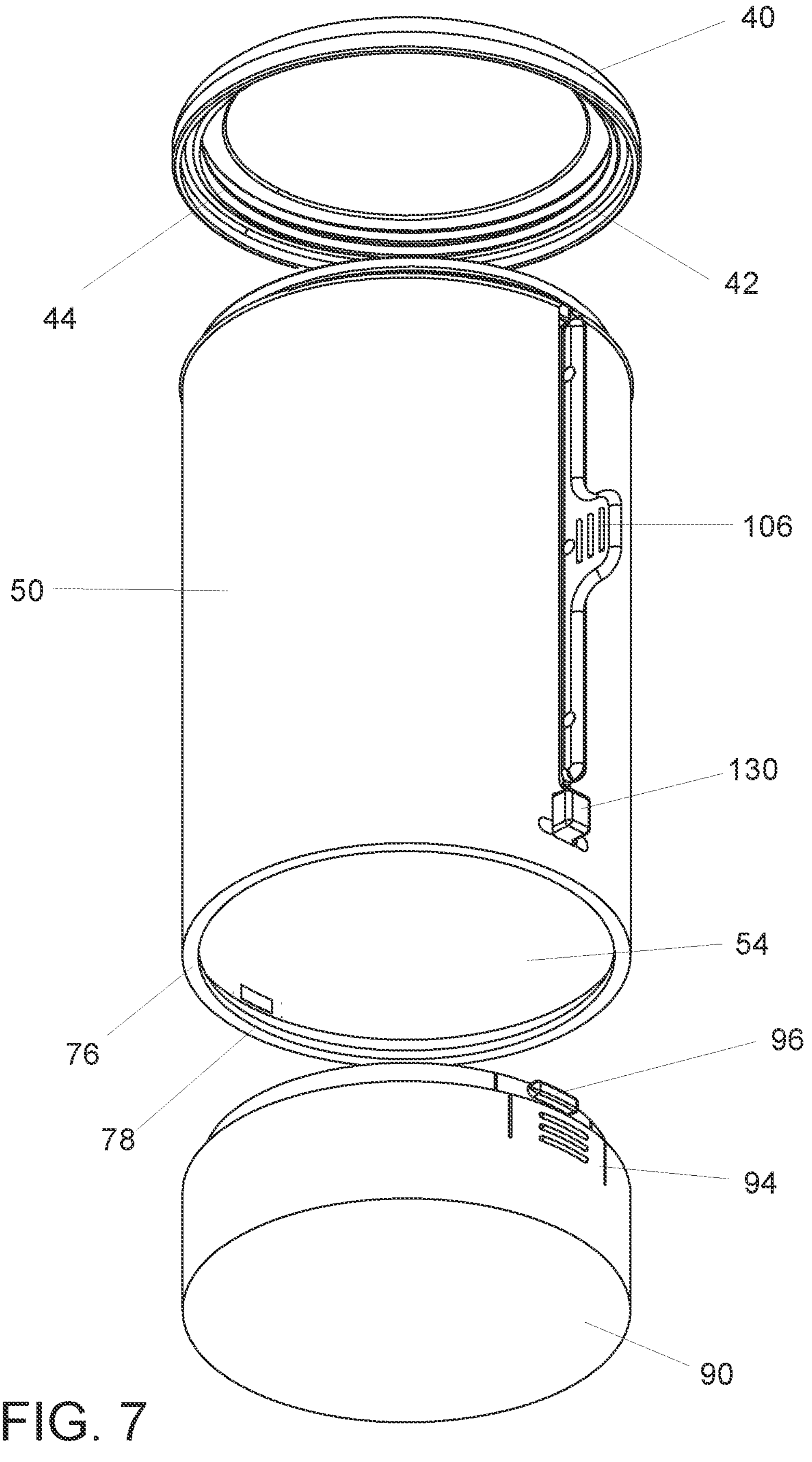
FIG. 7 is a bottom front perspective view of a marketing beverage container in accordance with aspects of the present invention illustrating the lid and storage compartment removed from the container.
Figure 8:
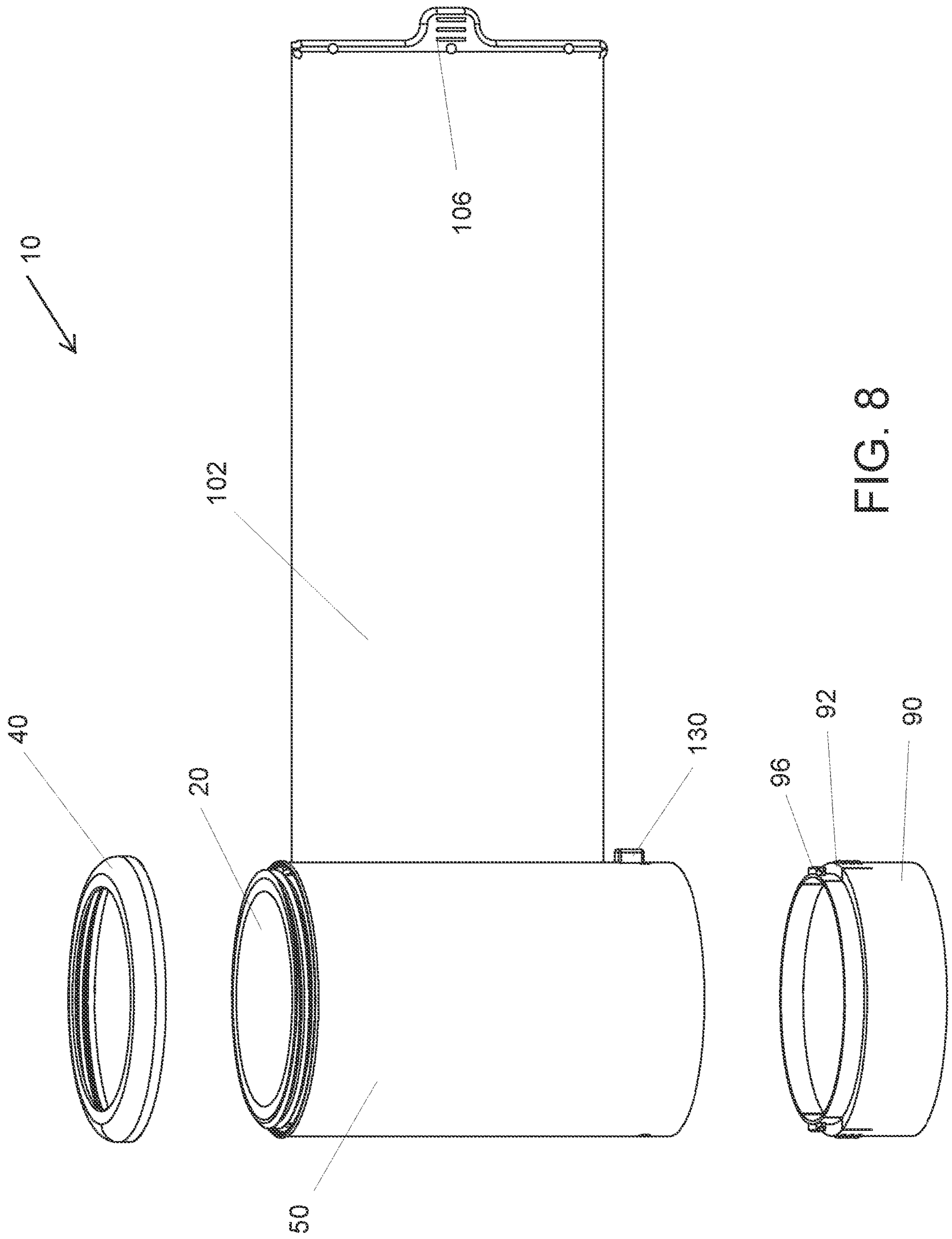
FIG. 8 is a front perspective view of a marketing beverage container in accordance with aspects of the present invention illustrating the pull-out extended from the container and illustrating the lid and storage compartment removed from the container.

With reference to FIGS. 6-8, the beverage container holder apparatus 10 includes an insert 102 of pull-out 100 contained between inner shell 20 and outer shell 50. The insert is further contained between the two shells 20 and 50 by a cap or lid 40. The cap has an inner sidewall 42 that includes threads 44 formed thereon that engage with threading formed on an upper end of the outer shell 50 near the open top 56. A rim 76 on a bottom 54 of the outer shell 50 includes a flange 78 extending outward about the rim 76. The removeable base 90 snaps onto and releases from the bottom of the outer shell 50. The removeable base 90 includes slots 94 that form flexible tabs 92 in the sidewall of the removeable base 90. The tabs include hooks 96 formed on free ends of the tabs 92. When the base 90 engages the rim 76, the hooks engage to the flange 78 of the rim 76. To remove the base 90 from the outer shell 50, the tabs 92 are pressed inward, releasing the hooks 96 from the flange 78.

Figure 9:
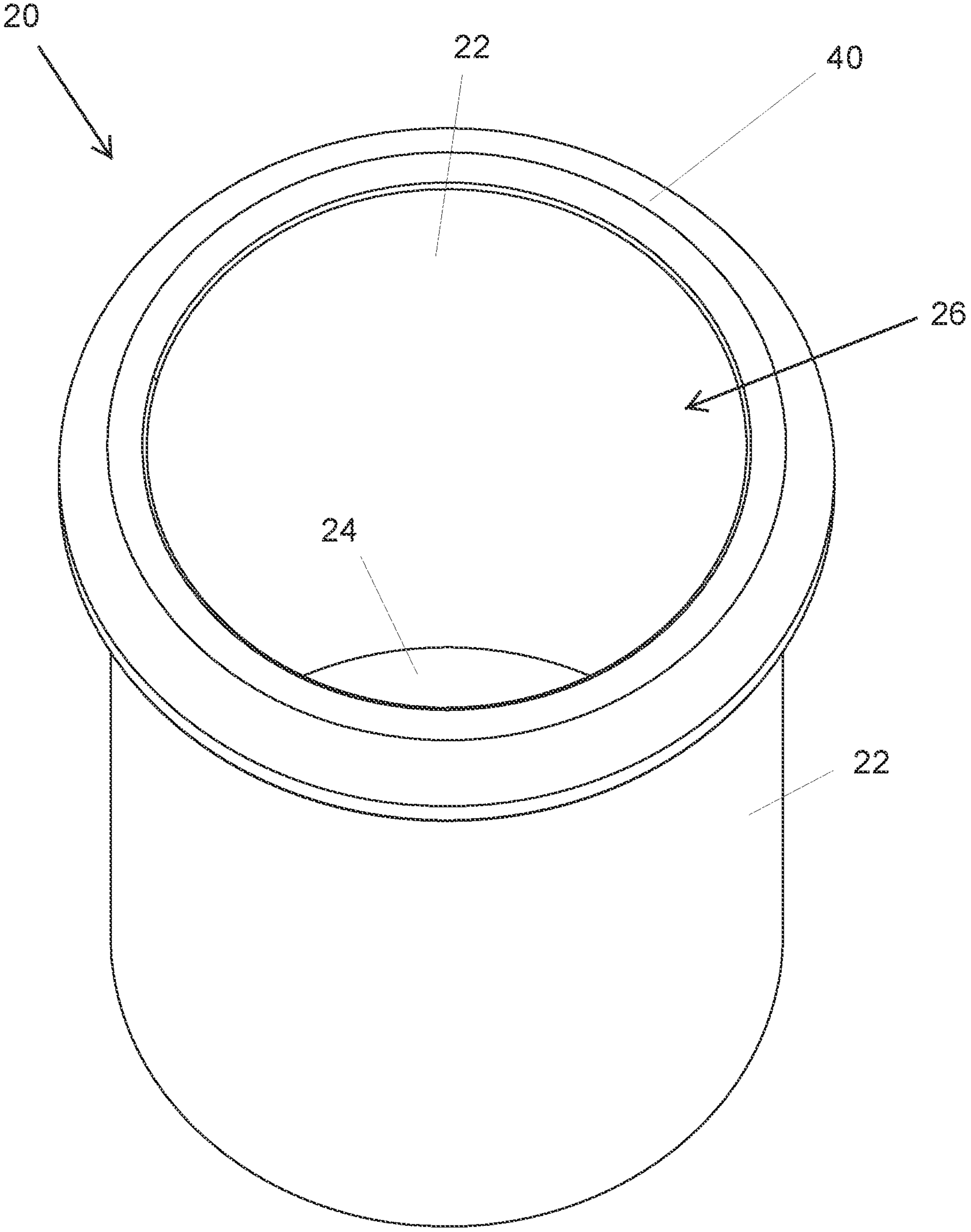
FIG. 9 is a top perspective view of an inner shell of the beverage container in accordance with aspects of the invention.
Figure 10:
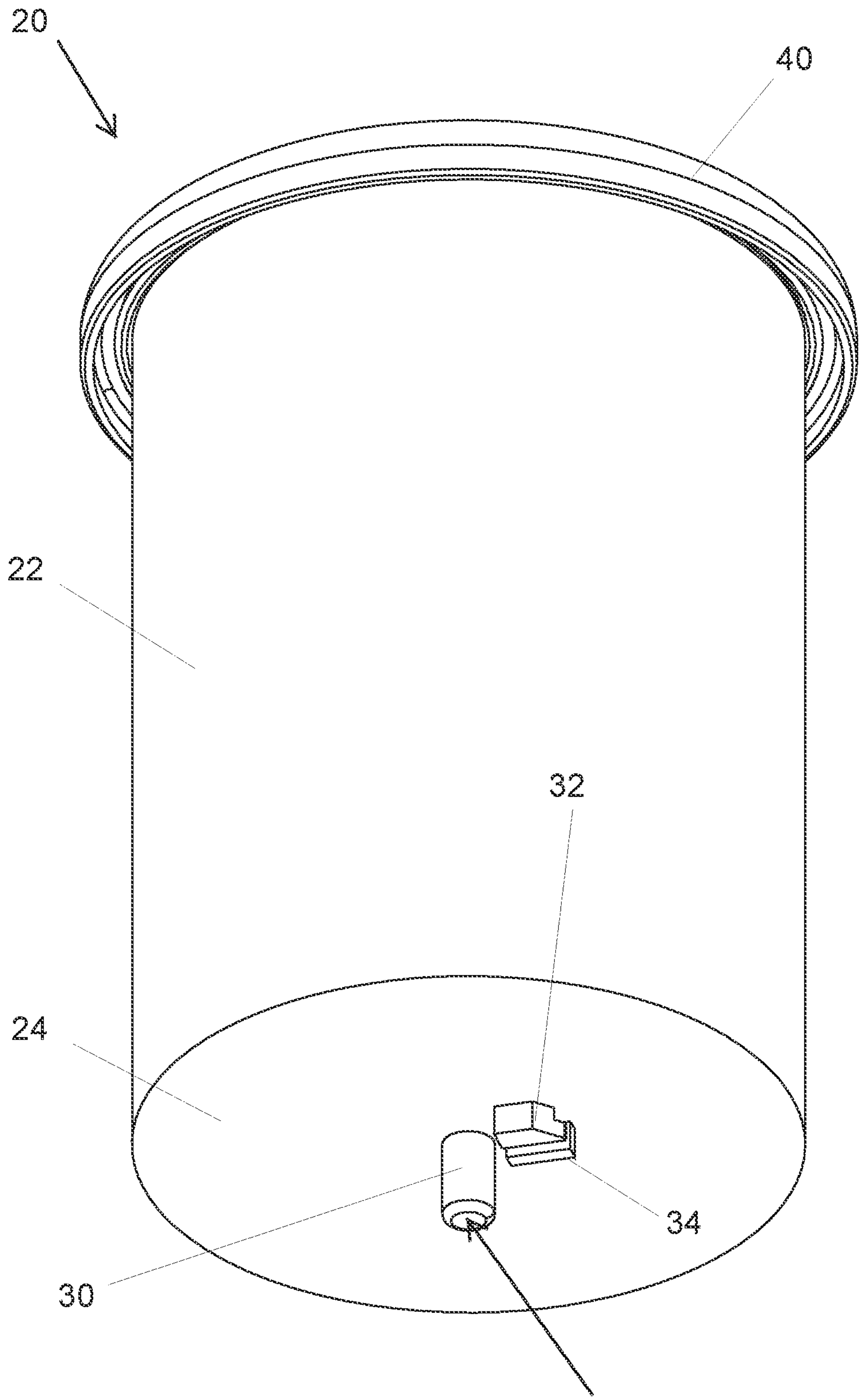
FIG. 10 is a bottom perspective view of an inner shell of the beverage container in accordance with aspects of the invention.

Referring next to FIGS. 9-10 the inner shell 20 includes sidewall 22 and an at least partially enclosed bottom 24. The sidewall 22 may be constructed from a variety of known materials depending upon whether the sidewall is intended as an insulator or a drinking vessel. Further, a removeable or permanent insulating material such as a foam or rubber may be added to the interior of the inner shell. When the inner shell is used as a beverage container, a beverage can or bottle may be inserted into the interior of the inner shell through the open top 26. One or more apertures 28 may be formed in the bottom of center rotation post 30 to allow air to escape as the can or bottle is inserted into the interior of the inner shell. An underside of the bottom includes a center rotation post 30 extending downward from the underside of the bottom 24. Those skilled in the art will appreciate that the center post 30 may alternatively be incorporated into the inner bottom 54 of the outer shell 50 and the inner annular ring 62 may alternatively be incorporated into the underside of the bottom 24 of the inner shell 20. A coil spring 210 is positioned about the post 30 and a hub 158 of the retention member 150 is also positioned on the post and rotates about post 30. Post 30 further engages with an inner annular ring 62 extending from the inner bottom of the outer shell 50. The annular ring centers the inner shell 20 within the outer shell 50. To further retain the outer and inner shells in a fixed orientation with respect to each other, the center post may be fixed to bottom of the outer shell. Without limitation, the fixation may be accomplished with an adhesive, a fastener such as a screw or may be a mechanical fit between the post and annular ring.

Figure 11:
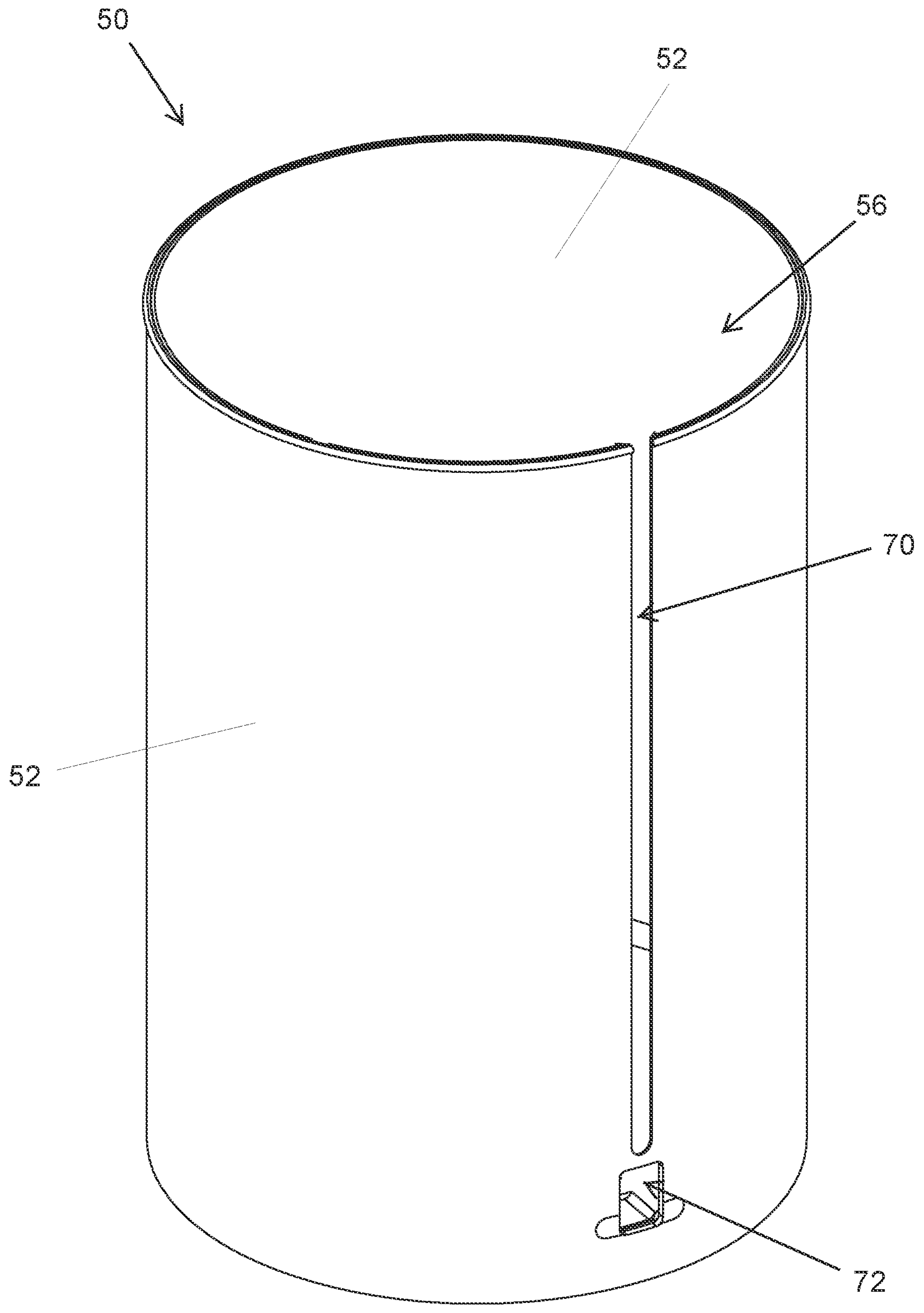
FIG. 11 is a front perspective view of an outer shell of the beverage container apparatus in accordance with aspects of the invention.
Figure 12:
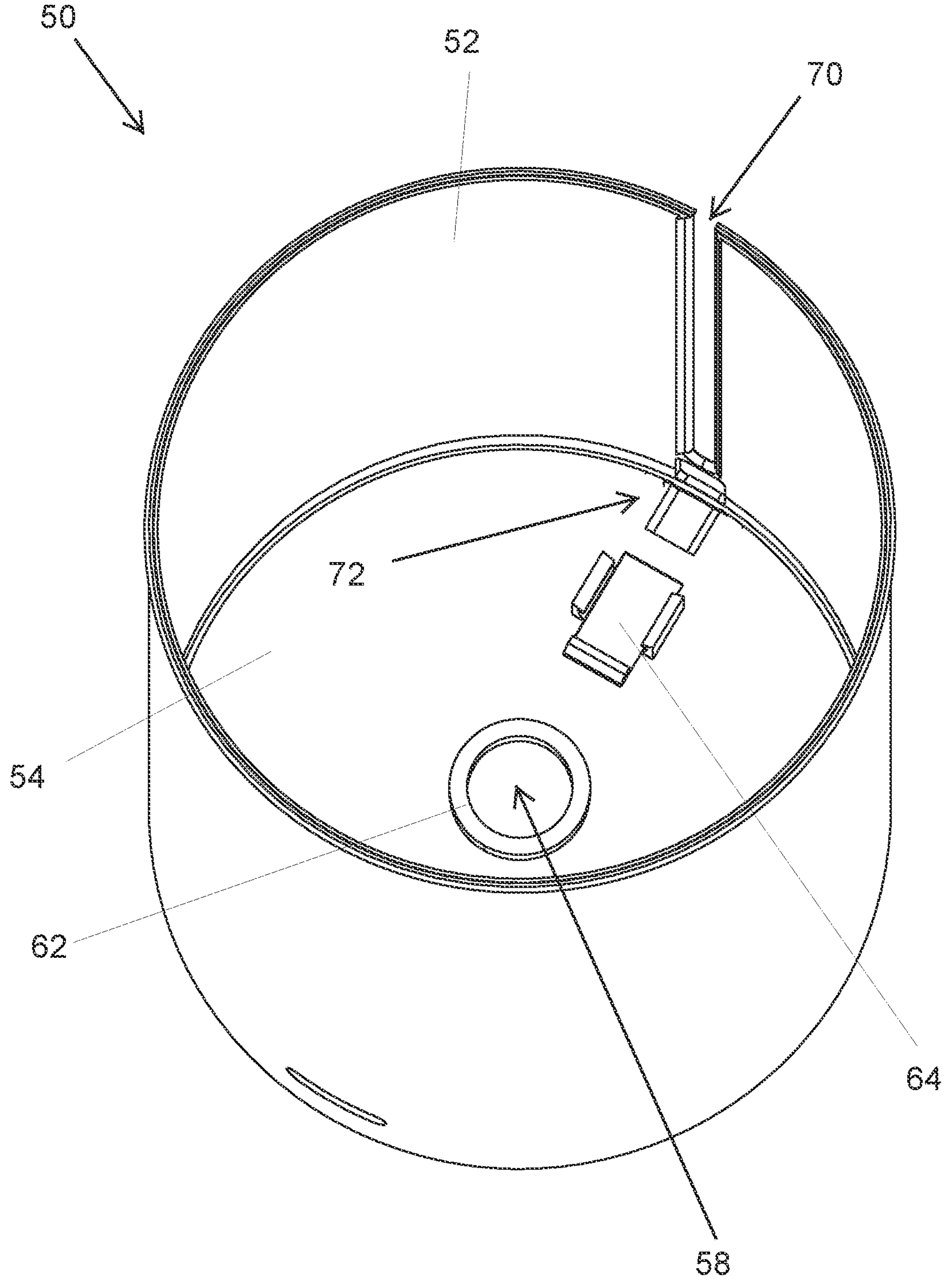
FIG. 12 is a top perspective view of an outer shell of the beverage container in accordance with aspects of the invention.
Figure 13:
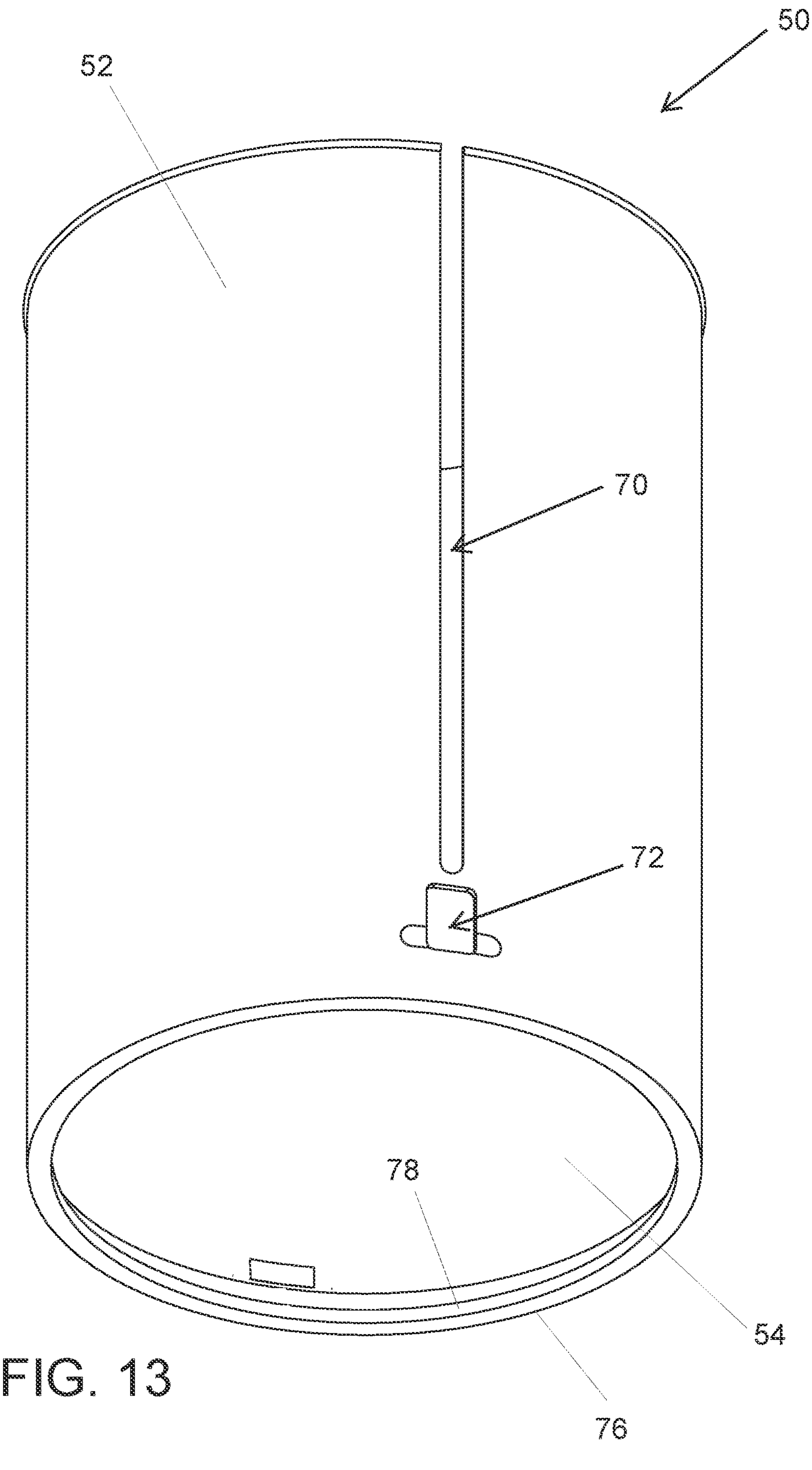
FIG. 13 is a bottom perspective view of an outer shell of the beverage container in accordance with aspects of the invention.

FIGS. 11-13 illustrates the outer shell 50 in greater detail. The outer shell 50 includes cylindrical sidewall 52 having an open top 56 and at least partially enclosed bottom 54. One or more apertures may extend through the outer shell to allow air or fluid to escape. Annular ring 62 is formed on the inside bottom of the shell 50. The ring 62 is centered about the center 58 of the bottom. Also formed on the inside bottom 54 is a retention mount 64. The retention mount 64 extends from the bottom 54 and is adapted for receiving and fixing a lock mechanism assembly 130 to the bottom of the outer shell. Slot 70 extends through sidewall 52. Insert 102 of the pull-out member 100 extends through slot 70. An aperture 72 is also formed in the sidewall 52 and is aligned with the retention mount 64. The aperture is sized to allow lock button 140 of the lock mechanism 130 to freely slide though the aperture 72 without contacting the sidewall 52. The external bottom of the outer shell 50 is adaptable for receiving and fixing in place the removeable base 90. Those skilled in the art will appreciate that other attachment mechanisms may be utilized to replace the rim 76 and flange 78 that engage with the removeable base 90.

Figure 14:
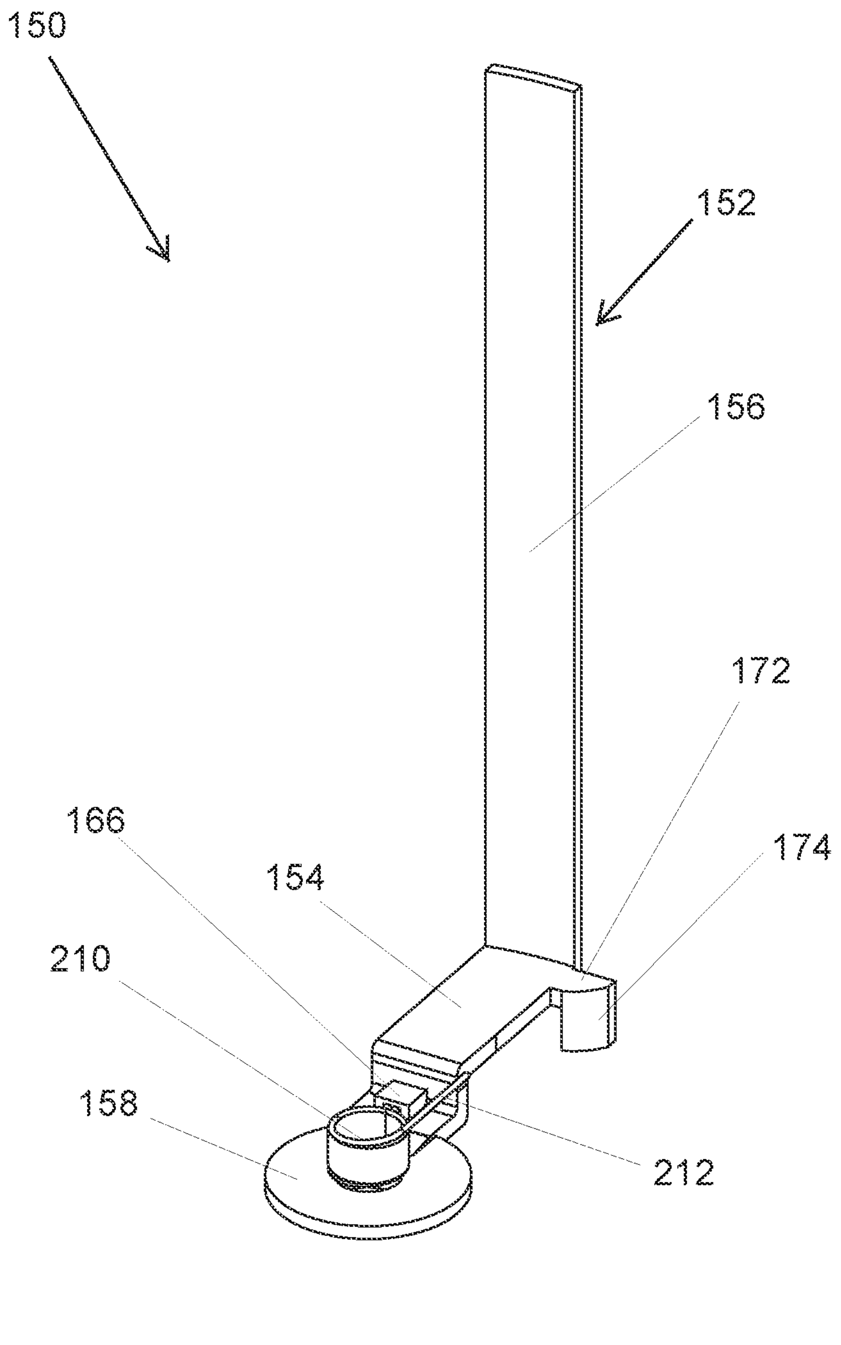
FIG. 14 is a front perspective view of a retention member of the beverage container in accordance with aspects of the invention and having a single retention arm and illustrating a coil spring engaged thereto.
Figure 15:
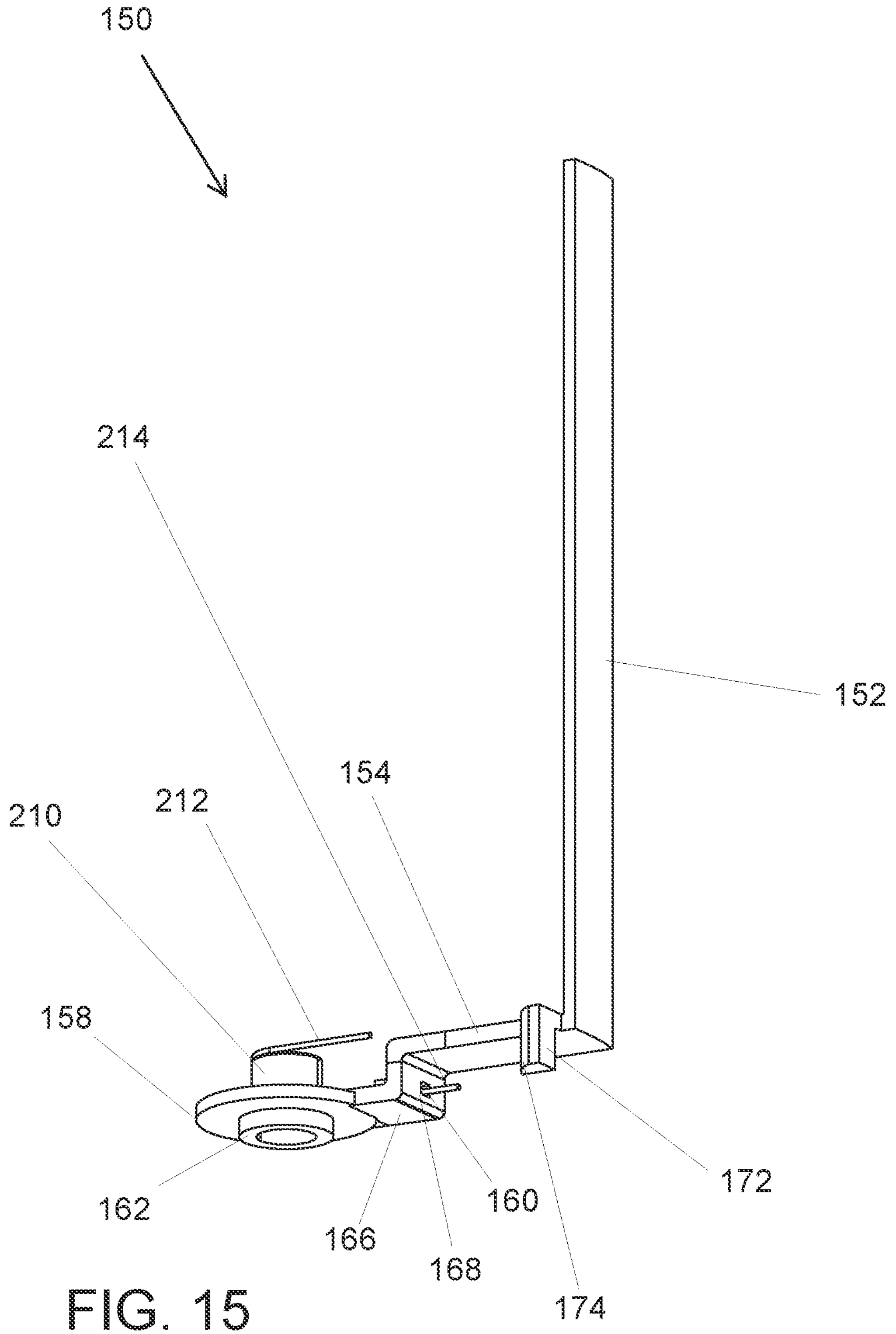
FIG. 15 is a side bottom perspective view of a retention member of the beverage container in accordance with aspects of the invention and having a single retention arm and illustrating a coil spring engaged thereto.
Figure 16:
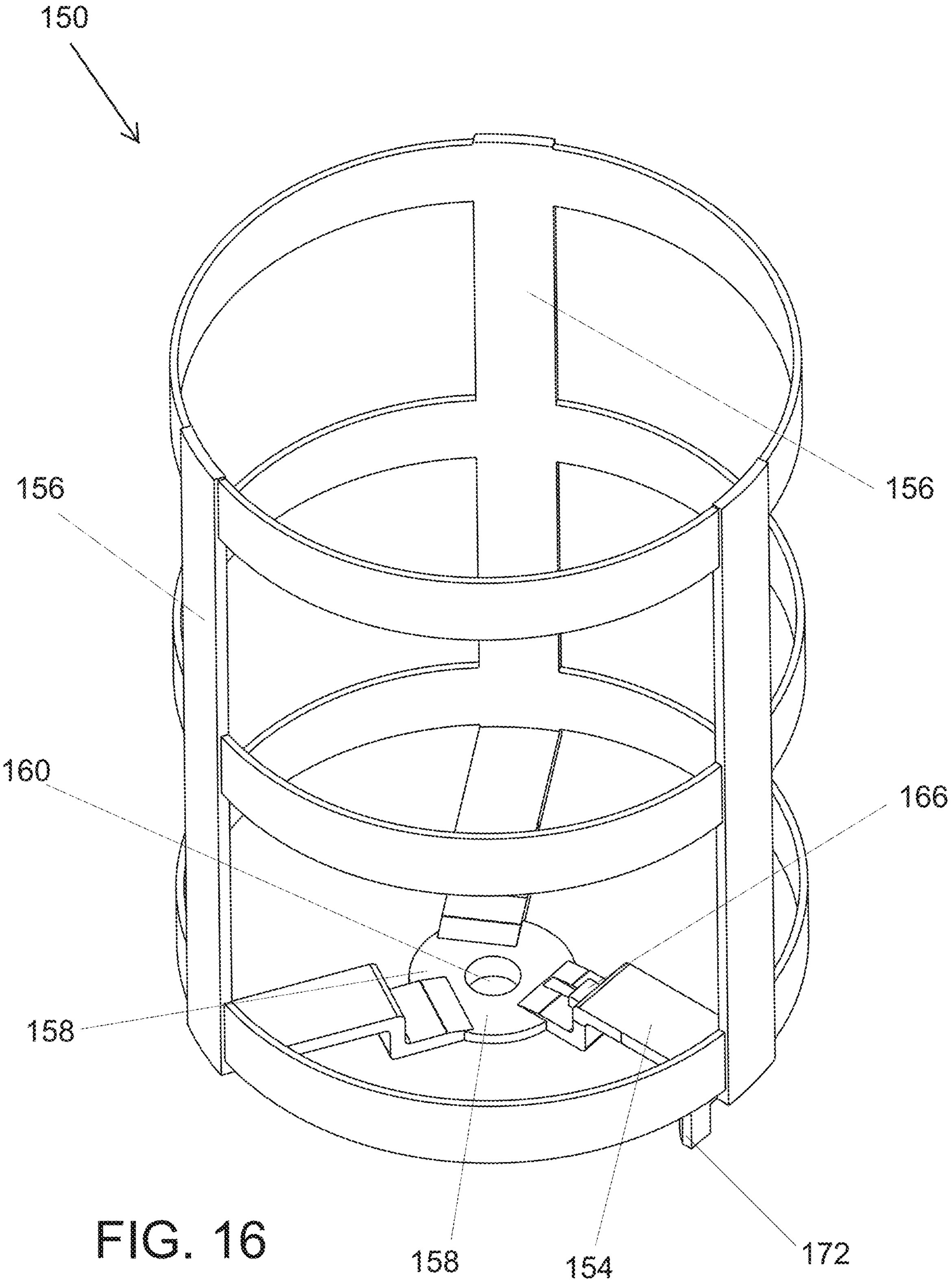
FIG. 16 is a front perspective view of a retention member of the beverage container in accordance with aspects of the invention and having multiple retention arms.
Figure 17:
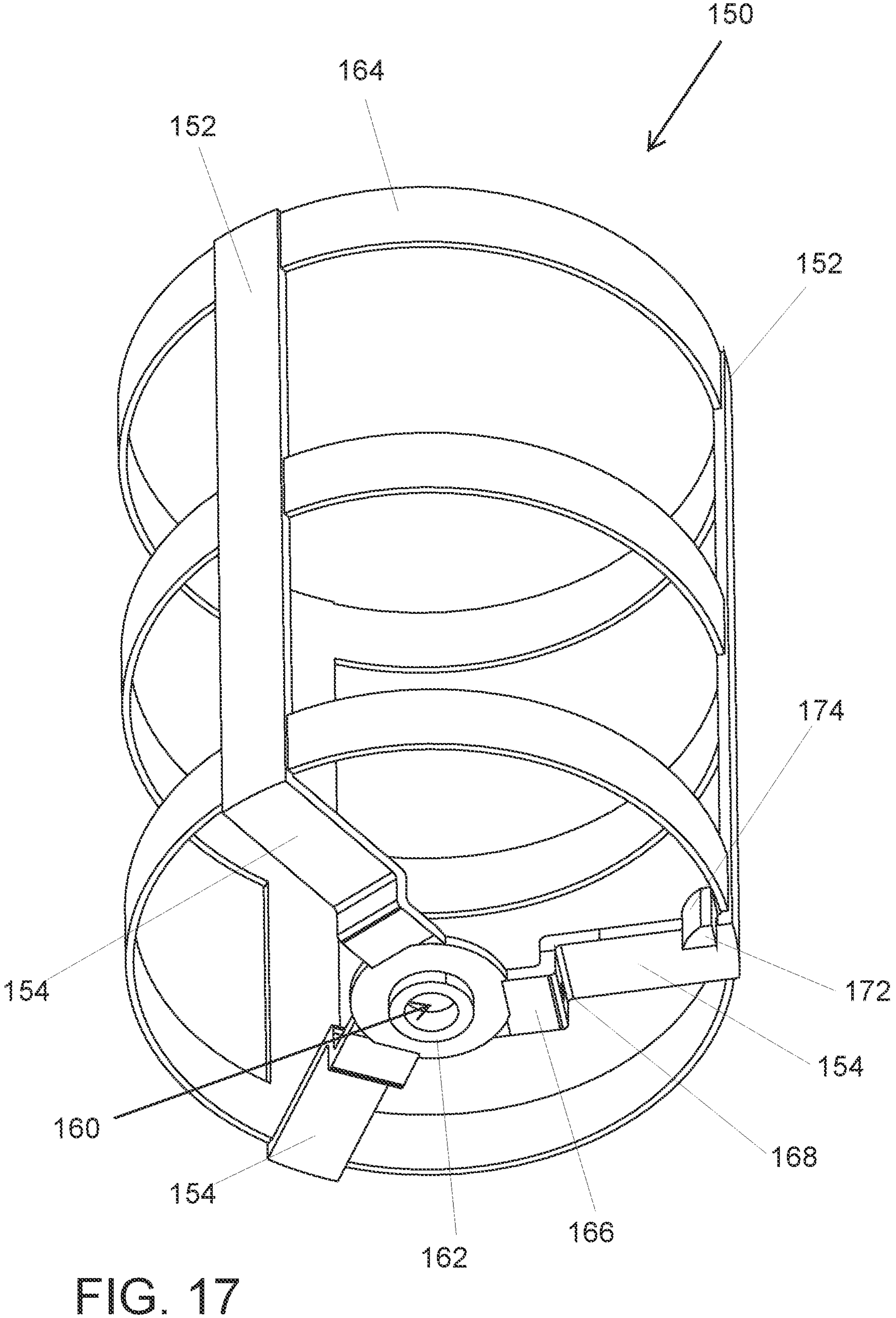
FIG. 17 is a bottom perspective view of a retention member of the beverage container in accordance with aspects of the invention and having multiple retention arms.

FIGS. 14-15 illustrates a single arm retention member 150 in greater detail. The arm 152 of the retention member 150 includes base 154, vertical upright member 156, and center hub 158. An aperture 160 extends through the center hub 158 and annular rim 162 extends from a bottom of hub 158. The base 154 includes a stop member for the lower arm 214 of spring 210. The lower arm 214 extends through aperture 168 formed in the base 154. In this manner as the vertical member 156 rotates about the center 58 of the outer shell 50, the lower arm 214 of spring 210 also rotates. Tab 172 extends from a bottom of the base 154 and includes an angled guide surface 174. FIGS. 16-17 illustrates a multi arm retention member 150 in greater detail. In certain embodiments, multiple arms 152 are combined to form a single cage. Cross members 164 connect the arms in a spaced relation.

Figure 18:
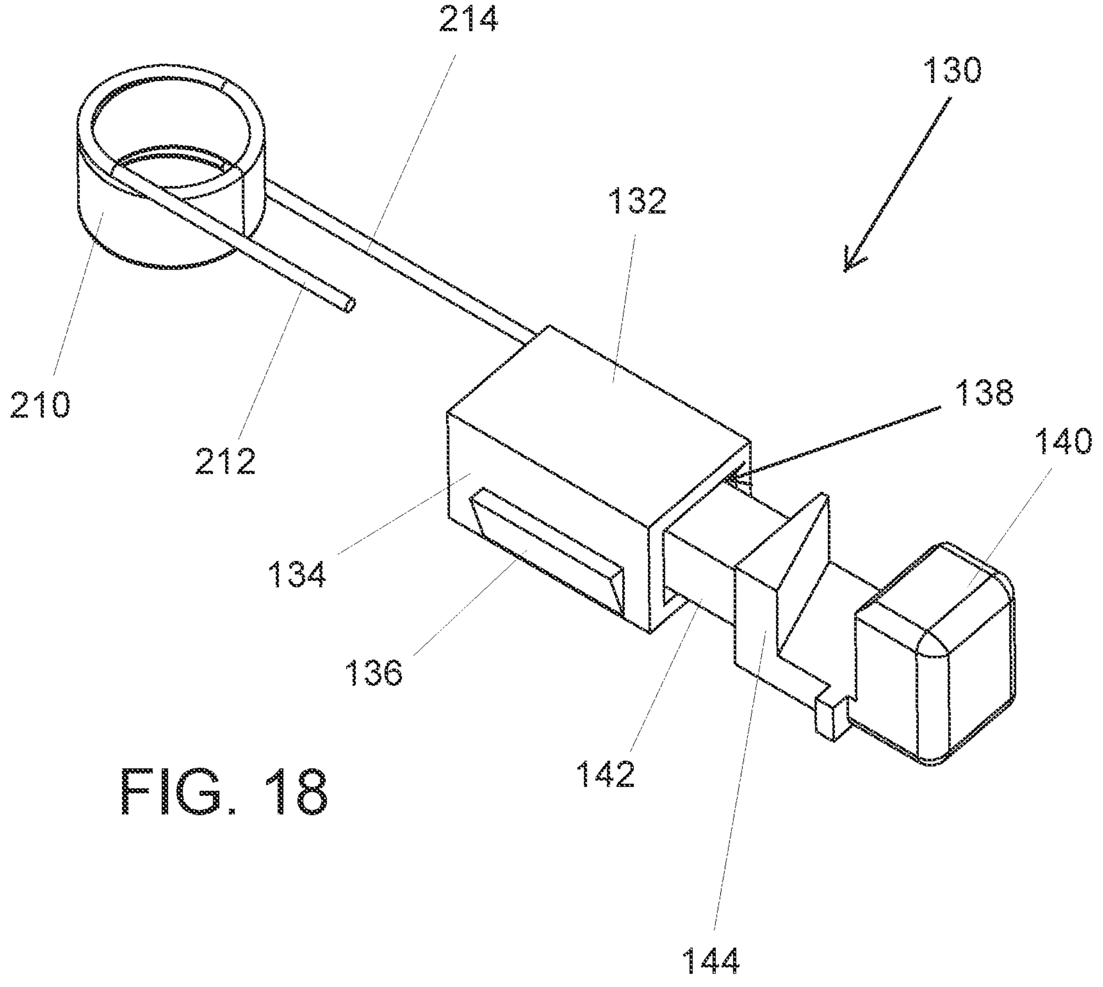
FIG. 18 is a front perspective view of a lock button of the beverage container in accordance with aspects of the invention and illustrating a coil spring aligned thereto.
Figure 19:
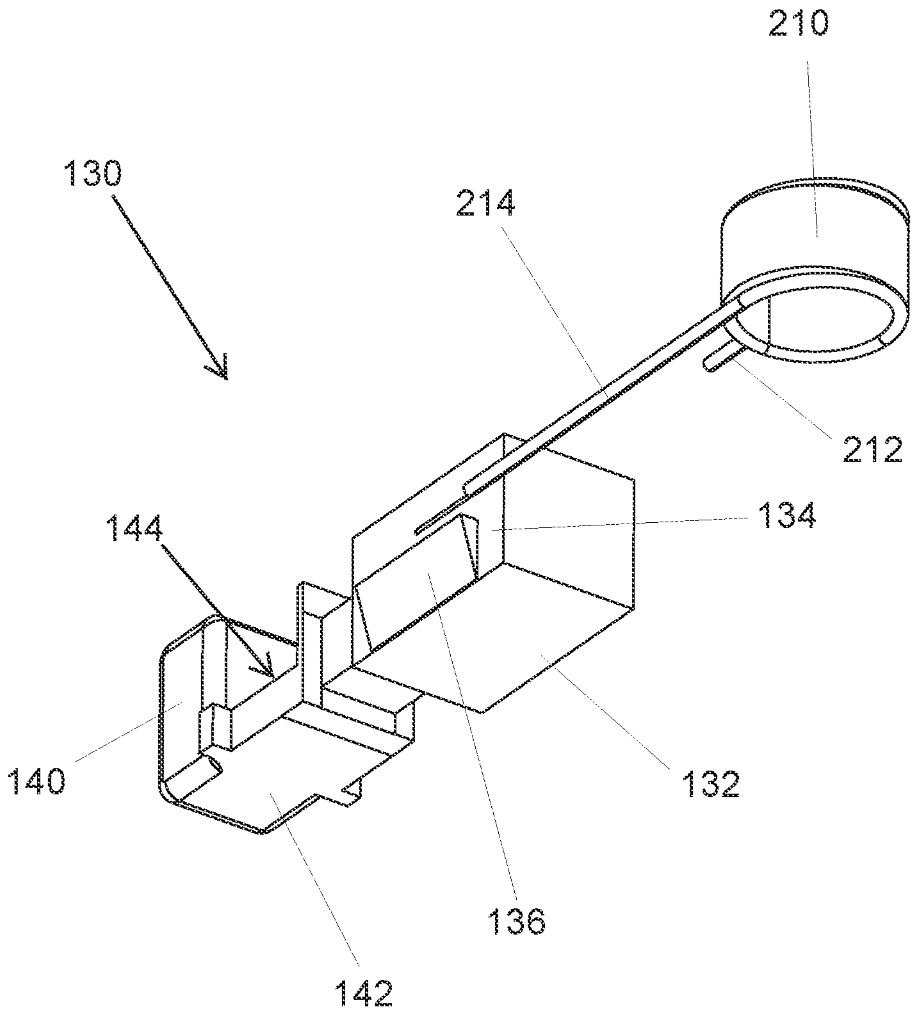
FIG. 19 is a bottom back perspective view of a lock button of the beverage container in accordance with aspects of the invention and illustrating a coil spring aligned thereto.
Figure 20:
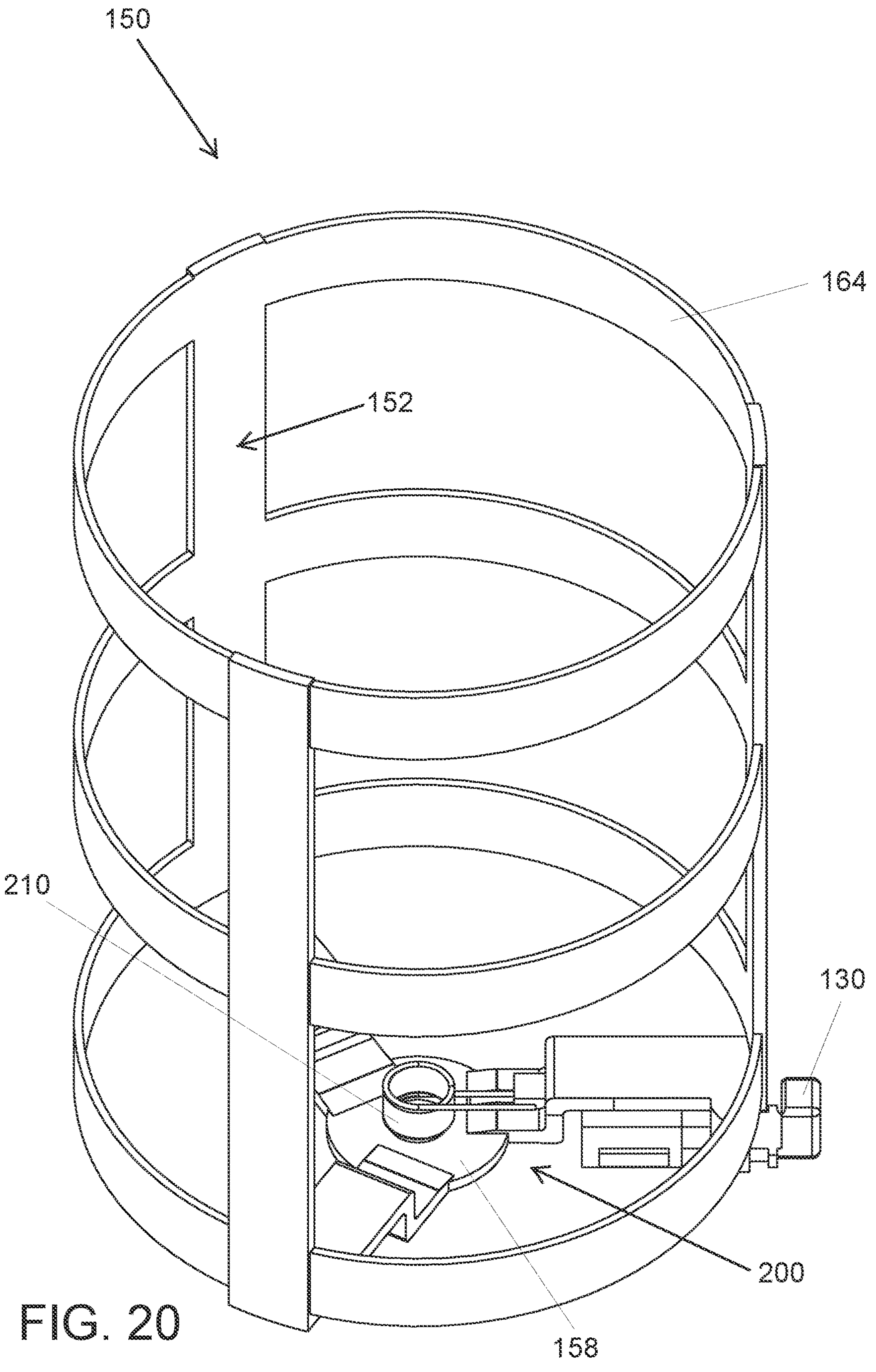
FIG. 20 is a top front perspective view of a retention member having multiple arms of the beverage container in accordance with aspects of the invention and illustrating the lock button and coil spring engaged thereto.
Figure 21:
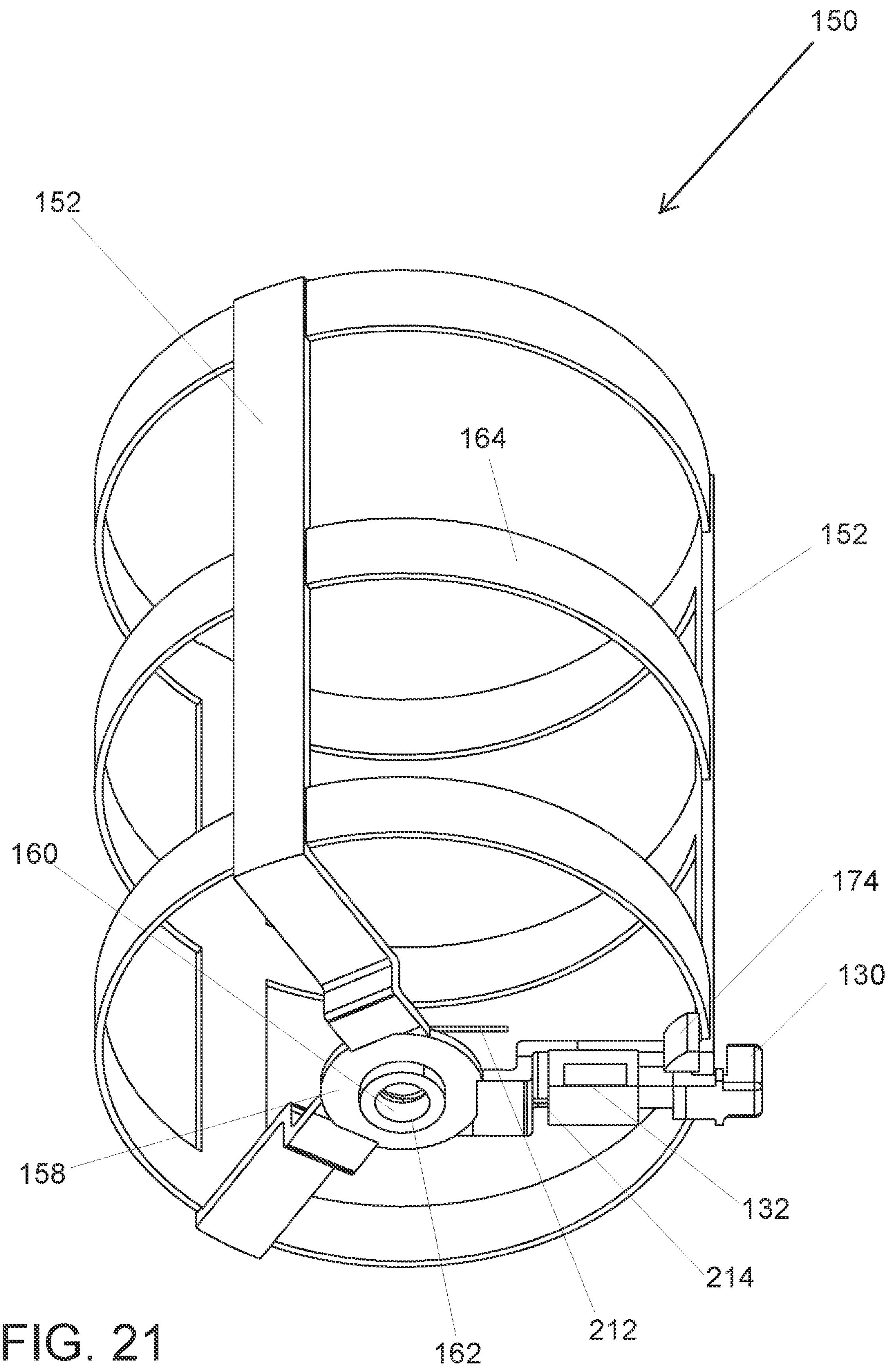
FIG. 21 is a bottom front perspective view of a retention member having multiple arms of the beverage container in accordance with aspects of the invention and illustrating the lock button and coil spring engaged thereto.
Figure 22:
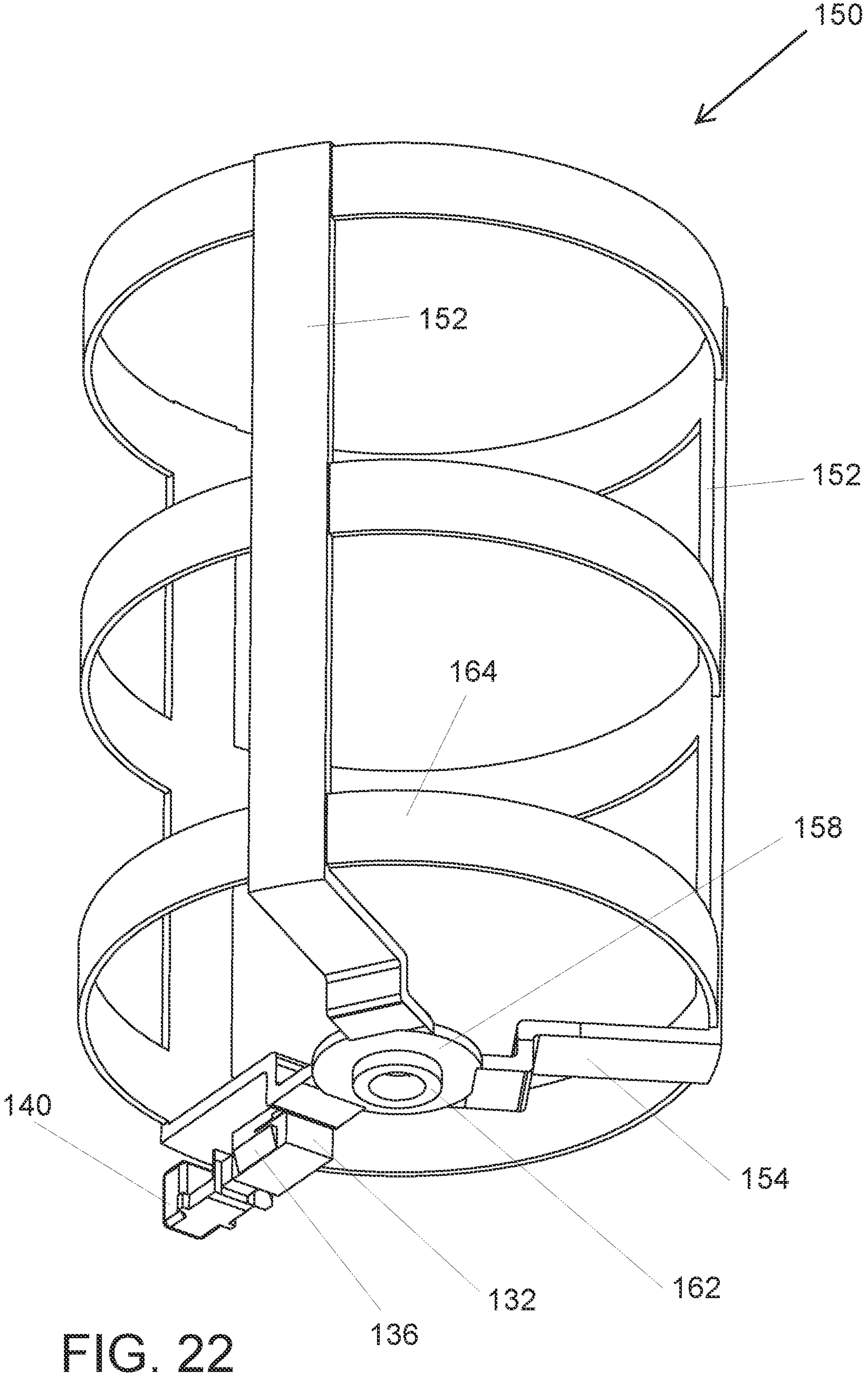
FIG. 22 is a bottom back perspective view of a retention member having multiple arms of the beverage container in accordance with aspects of the invention and illustrating the lock button and coil spring engaged thereto.
Figure 23:
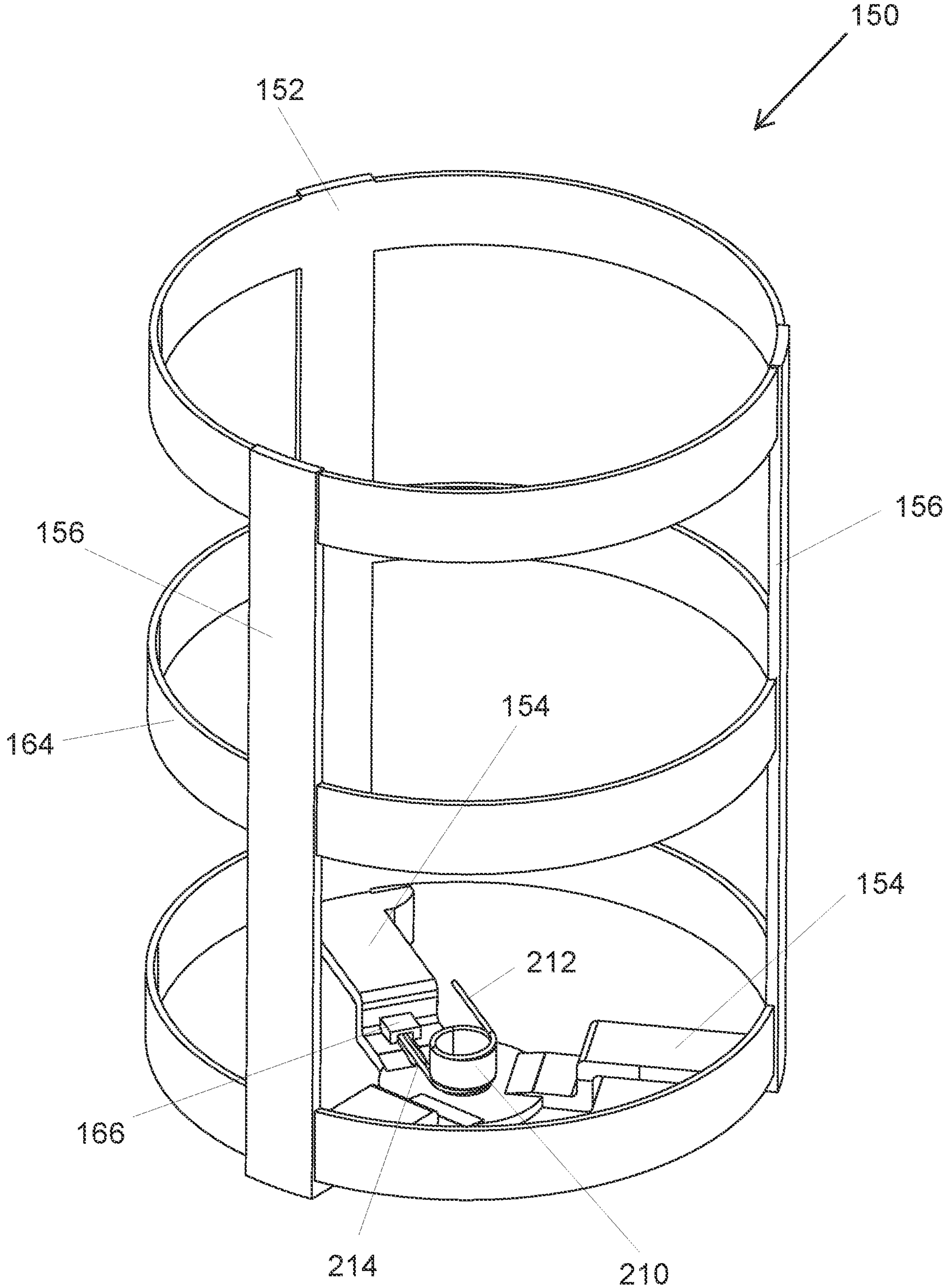
FIG. 23 is a top back perspective view of a retention member having multiple arms of the beverage container in accordance with aspects of the invention and illustrating the lock button and coil spring engaged thereto.

Referring next to FIGS. 18-19, the lock assembly 130 will next be described in greater detail. The lock assembly includes a housing 132 and lock button 140. The housing has external sidewalls 134 and a cavity 138 extends into the housing. Locking hooks 136 are formed on the sidewalls and engage with the retention mount 64 of the outer shell 50. Lock button 140 includes a stem extending from the button. The stem 142 includes a slot or angled channel 144 formed in the stem. A free end of the stem inserts into the cavity 138 of housing 132. A compression spring positioned within the cavity compresses when a force is applied against the button. When compressed, the compression spring applies a force against the stem, pushing the stem out of the housing.

Figure 27:
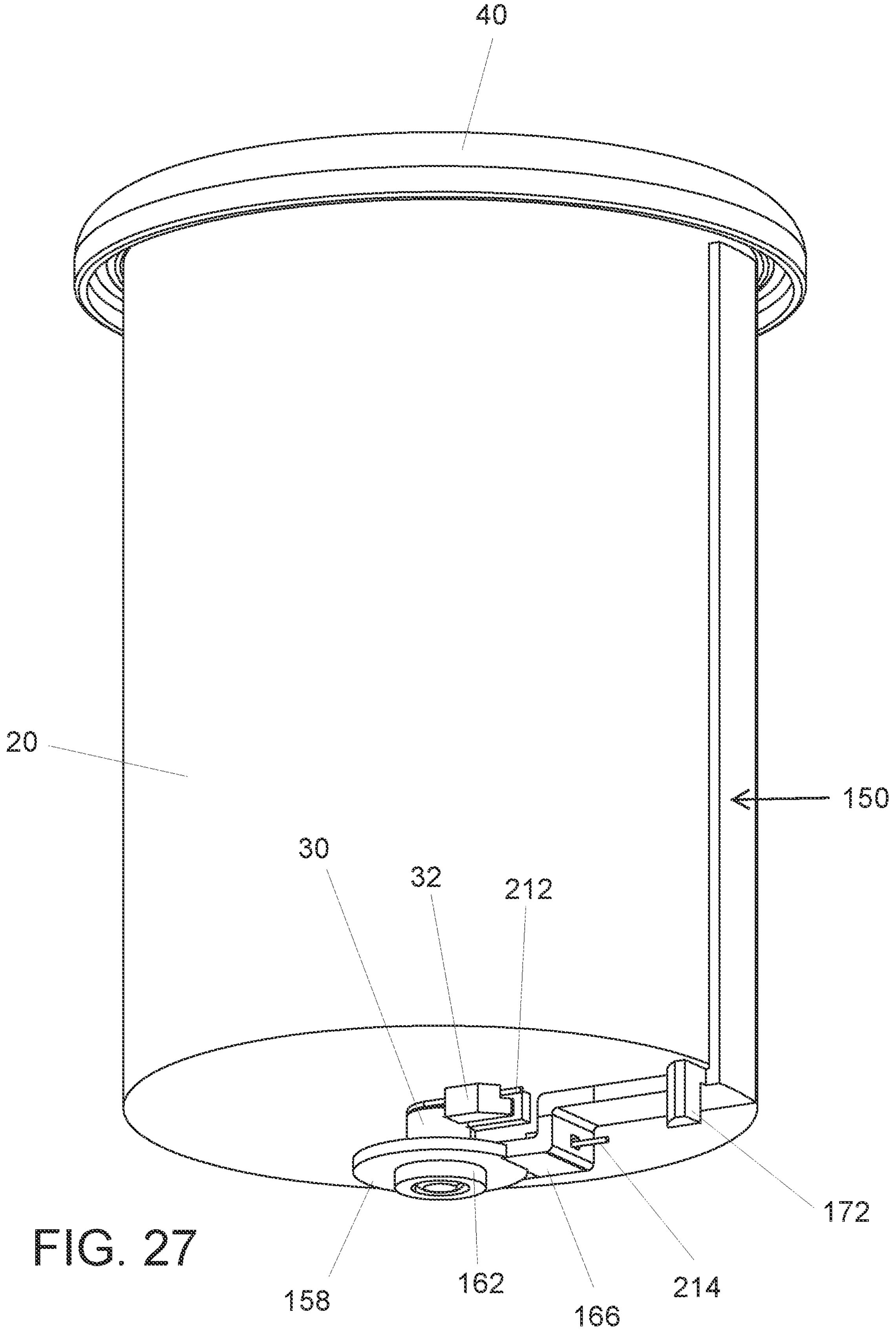
FIG. 27 is a bottom perspective view of an inner shell of the beverage container in accordance with aspects of the present invention and illustrating a single arm retention member and coil spring oriented in an engaged position relative to the bottom of the outer shell.
Figure 28:
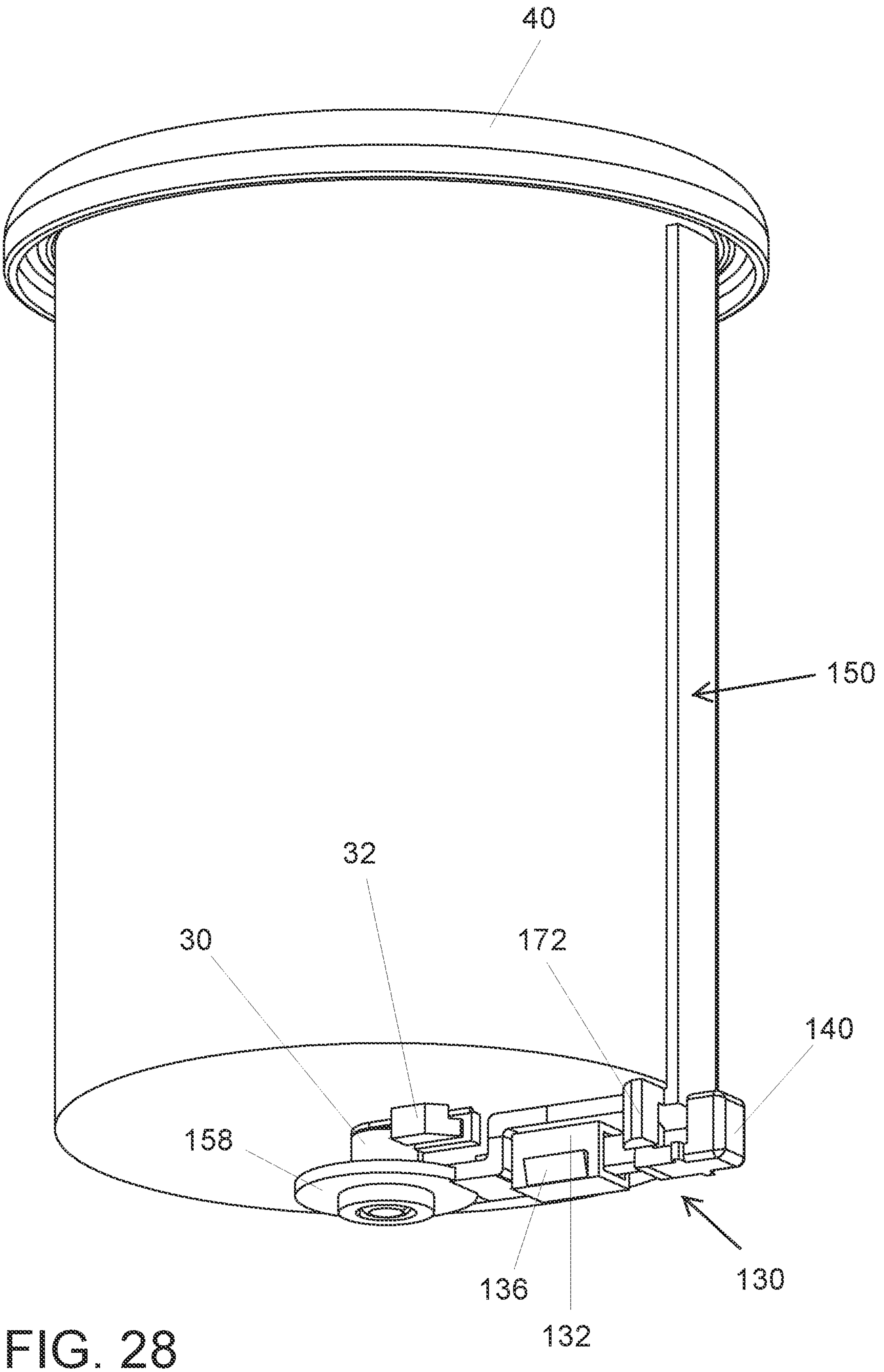
FIG. 28 is a bottom perspective view of an inner shell of the beverage container in accordance with aspects of the present invention and illustrating a single arm retention member, lock button, and coil spring oriented in an engaged position relative to the bottom of the outer shell.
Figure 30:
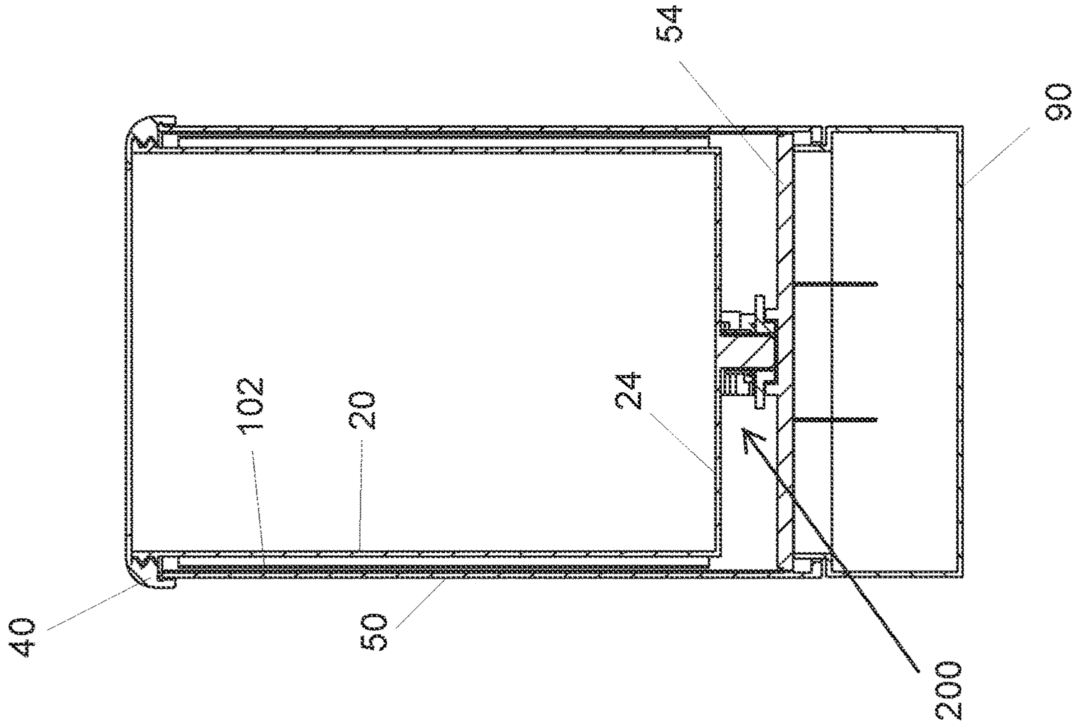
FIG. 30 is a cross-sectional view taken along line A-A of FIG. 29.
Figure 29:
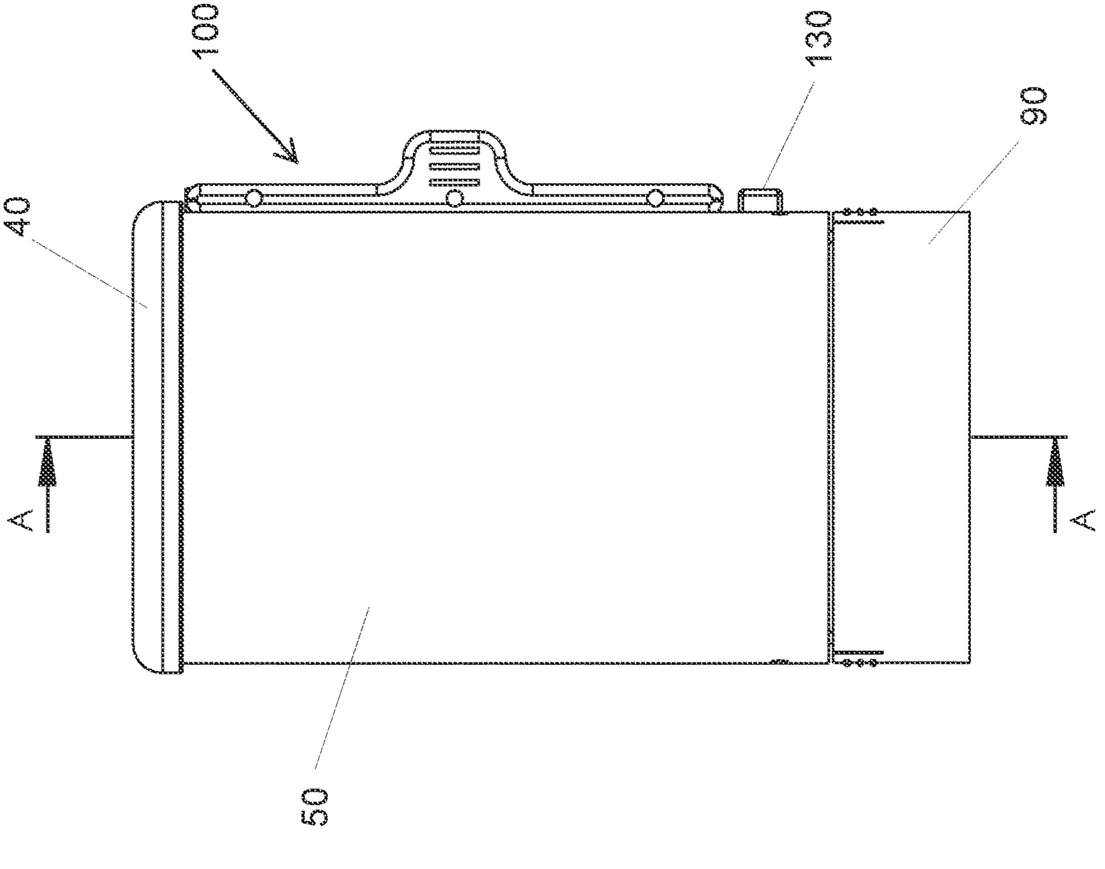
FIG. 29 is a front elevational view of a beverage container in accordance with aspects of the invention.
Figure 32:
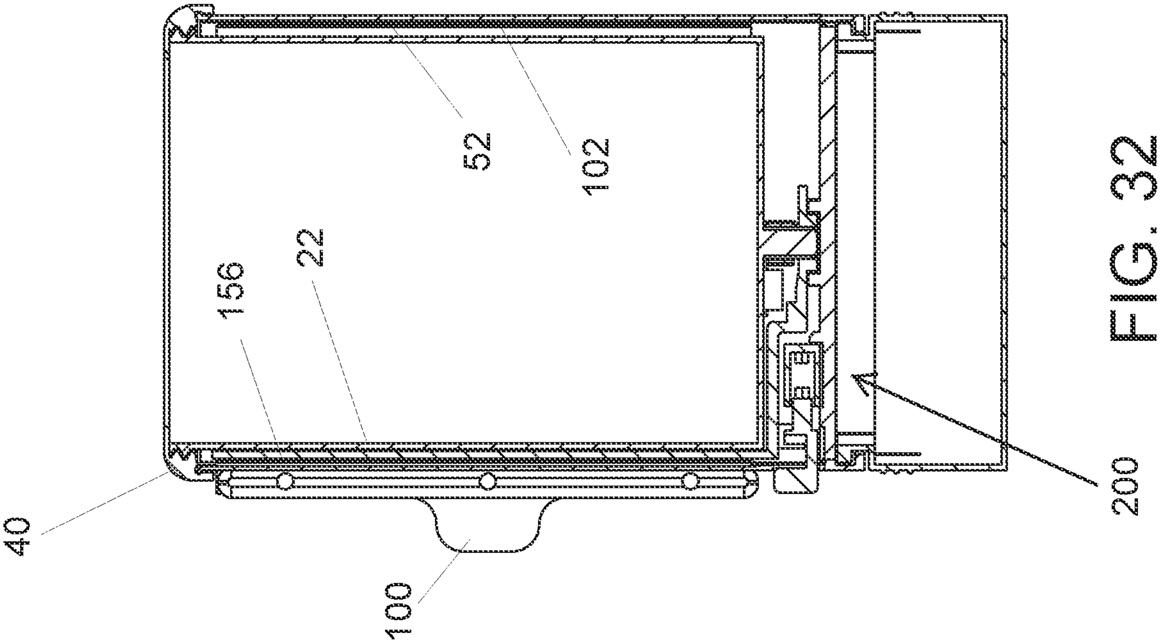
FIG. 32 is a cross-sectional view taken along line B-B of FIG. 31.
Figure 31:
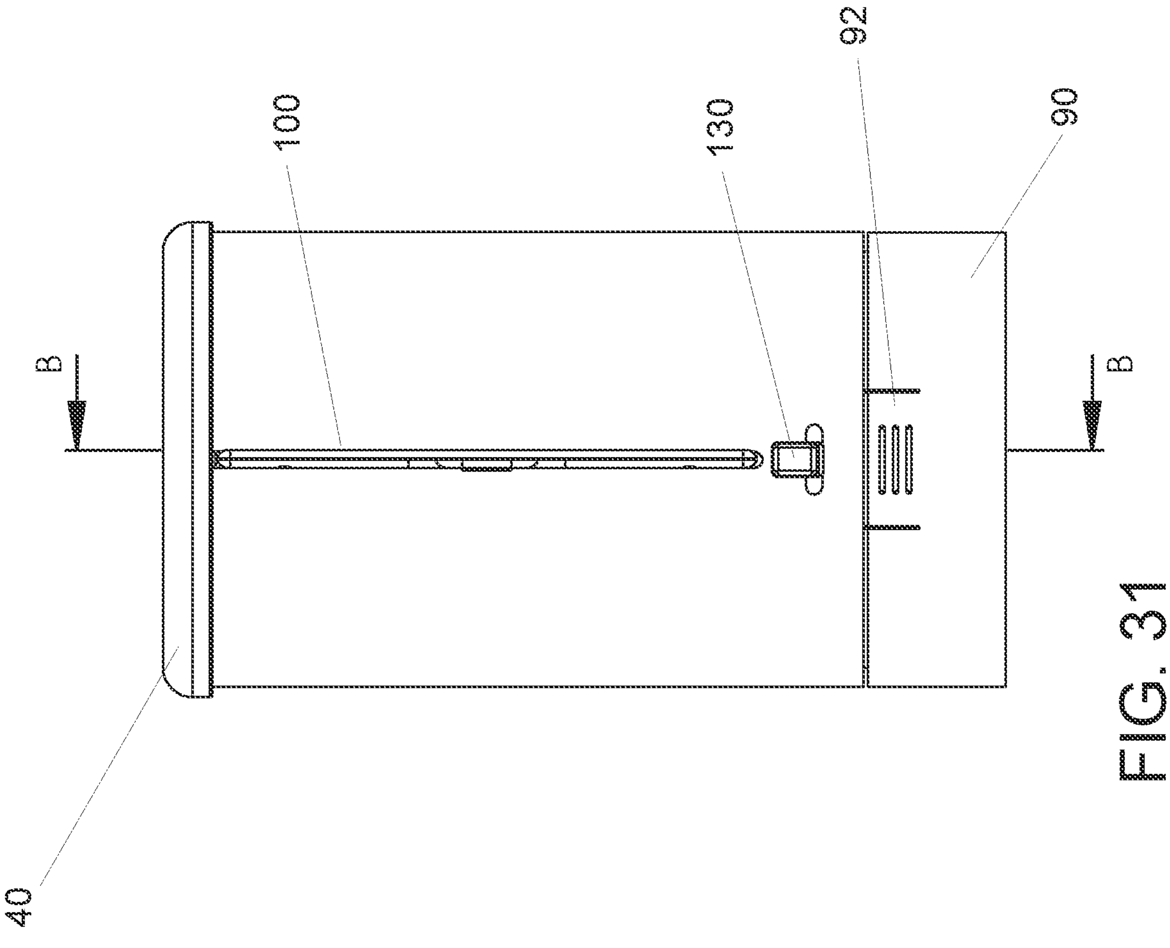
FIG. 31 is a side elevational view of a beverage container in accordance with aspects of the invention.

FIGS. 20-26 illustrates a multiple arm retention member 150 in association with lock mechanism 130. The lock mechanism is positioned under the base 154 of the arm 152. The base 154 rotates above the lock mechanism 130 which is fixed to the bottom of the outer shell 50. As the base 154 of arm 152 rotates above and past the housing 132 of the lock mechanism 130 towards the extended position 146, tab 172 of the retention member 150 slides through slot 144 and engages with stem 142. As the tab 172 continues rotation, the stem is pressed inward against the compression spring. Further rotation of the tab past the slot causes the stem and button to slide outward. As the tab 172 of the retention member 150 is rotated towards the extended position, coil spring 210 is wound and tension is applied against the stop member 166 of the base 154 of the retention member 150. As the tab rotates past the slot 144, the tab 172 engages a side of the stem and rotation of the arm towards the retracted position is restricted. Pressing the button inward causes the stem to move inward and align the slot 144 with the tab 172. In this manner the tension in the coil spring causes the retention member 150 to rotate towards the retracted position and retention member may then continue rotation toward the retracted position 148. FIGS. 27-28 illustrates alignment of a single arm, inner shell 20 and lock mechanism 130. Fixed end 108 of the insert 102 is attached to a vertical upright member 156 of the retention member 150 at attachment point 110. As the arm 152 rotates, the insert is guided in and out of the beverage container 10 through slot 70. As the arm rotates towards the retracted position, the insert 102 is pulled through the slot 70 into the container 10 between the sidewall 22 of inner shell 20 and the sidewall 52 of the outer shell 50.

FIGS. 29-32 further illustrates coil mechanism 200 of an assembled beverage container. Generally, coil mechanism 200 includes the combination of coil 210, retention member 150 and lock mechanism 130. Portions of the lock mechanism 130 and coil spring 210 are held in place between the inner shell 20 and outer shell 50. As pull-out stop member 106 is pulled outward, the retention member rotates towards the extended position 146. Lower arm 214 of the coil spring 210 rotates with the retention member 150 while the upper arm 212 of the coil spring 210 is held in place by the coil spring stop 32 extending from the bottom of the inner shell 20 and coil spring stop base 34 (see FIG. 10). In this manner the coil spring has increased tension as the retention member continues to rotate towards the extended position. Tension of the coil spring applies a torque against the retention member and tends to rotate the retention member towards the retracted position. A user may pull the insert out of the slot a sufficient amount such that the stem 142 of the lock mechanism engages the tab 172 of the retention member. The lock button 140 may be depressed to disengage the tab and stem, thereby allowing the coil spring to rotate the retention member towards the retracted position 148.

Those skilled in the art will appreciate that a self contained coil mechanism 200 of known suitable construction may replace the coil, lock assembly and retention member without departing from the scope of the present invention. Further the insert 102 may be constructed of various materials dependent upon the desired used of the beverage container 10. By way of example, and without limitation intended, the insert may be constructed of a waterproof plastic sheet. The sheet may include indicia on one or both sides or the sheet may be blank on one or both sides. Of course, a user may use a dry erase marker or permanent marker to apply its own desired indicia on the insert. The indicia on the insert may supplement the indicia on the outer shell or may include indicia independent of the outer shell.

In certain embodiments the sidewall of the outer shell may be separable from the bottom, allowing the user to interchange multiple sidewalls with varying messages or indicia as desired (see FIGS. 25, 26, and 29-32). Further, the sidewall may be made from a transparent material to reveal the messages on the outer side of the insert. In certain embodiments the insert may comprise a waterproof paper or lenticular sheet to enhance images applied to the sheet. The lenticular sheet may be a transparent material with a supplement applied to the inner wall of the outer shell to create a lenticular effect. Further, without limitation intended, the insert may include indicia applied to the sheet to thereby function as an effecting marketing or promotional object. Although the inner and outer sidewalls, storage compartment and lid may be comprised of plastic, other suitable materials may be used including plastic acrylics, aluminum, glass, ceramic and other materials suitable as a drinking vessel.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. A beverage container apparatus comprising:
- an outer shell having an open top, a sidewall with a slot, and an at least partially enclosed bottom;
- an inner shell having an open top and an at least partially enclosed bottom, wherein a portion of the inner shell is contained within an interior of the outer shell and wherein an interior of the inner shell is configured to accommodate a beverage vessel therein;
- a pull-out member positioned between the outer shell and inner shell, the pull-out member including an insert, wherein the insert is configured to slide through the slot between an extended and retracted position; and
- a removeable cap configured to engage with the open top of the outer shell, wherein the cap retains the pull-out member between the inner shell and outer shell.

2. The beverage container apparatus as recited in claim 1, further including a removable base engaged to a portion of the at least partially enclosed bottom of the outer shell.

3. The beverage container apparatus as recited in claim 1, wherein the insert of the pull-out member has one end fixed to a retention member and wherein the insert is contained between the inner shell and outer shell in a retracted position.

4. The beverage container apparatus as recited in claim 1, wherein the insert of the pull-out member is reeled by a coil mechanism.

5. The beverage container apparatus as recited in claim 3, further including a lock mechanism having a lock button to engage the retention member and retain the insert in an extended position.

6. The beverage container apparatus as recited in claim 1, further including a stop attached to a free end of the insert.

7. The beverage container apparatus as recited in claim 1, wherein the insert includes an advertising or marketing display.

8. The beverage container apparatus as recited in claim 7, wherein the outer shell includes indicia displayed on an external side of the outer shell.

9. The beverage container apparatus as recited in claim 1, wherein the insert is made from at least one of a waterproof sheet and a lenticular sheet.

10. The beverage container apparatus as recited in claim 1, wherein the outer shell is made of a lenticular material.

11. The beverage container apparatus as recited in claim 1, further including an arm oriented between the inner and outer shell such that an end of the insert is attached to the arm, and wherein a base of arm is attached to a coil mechanism.

12. The beverage container as recited in claim 11, wherein a plurality of arms combine to form a cage.

13. The beverage container as recited in claim 1, wherein the outer shell is comprised of a separable bottom and an annular sidewall.

14. A beverage container apparatus comprising:
- an outer shell having an open top, a sidewall with a slot, and an at least partially enclosed bottom;
- an inner shell having an open top and an at least partially enclosed bottom, wherein a portion of the inner shell is contained within an interior of the outer shell and wherein an interior of the inner shell is configured to accommodate a beverage vessel therein;
- a pull-out member positioned between the outer shell and inner shell, the pull-out member including an insert wherein the insert is configured to slide through the slot between an extended and retracted position;
- a coil mechanism that facilitates movement of the pull-out member between a retracted and extended position;
- an arm oriented between the inner and outer shell such that an end of the insert is attached to the arm, and wherein a base of the arm is attached to the coil mechanism;
- a removeable cap configured to engage with the open top of the outer shell, wherein the cap retains the pull-out member between the inner shell and outer shell; and
- a removable base engaged to a portion of the at least partially enclosed bottom of the outer shell.

15. The beverage container as recited in claim 14, wherein a plurality of arms are combined to form a cage.

16. The beverage container apparatus as recited in claim 15, wherein the insert of the pull-out member wraps around the cage in a retracted position.

17. The beverage container apparatus as recited in claim 15, further including a lock mechanism having a lock button to engage the cage and retain the insert in an extended position.

18. The beverage container apparatus as recited in claim 14, wherein the insert includes indicia displayed on at least one side of the insert.

19. The beverage container apparatus as recited in claim 14, wherein the insert is made from a waterproof sheet.

20. The beverage container apparatus as recited in claim 14, wherein the insert is made from a lenticular sheet.

* * * * *